(12) United States Patent
Hirose et al.

(10) Patent No.: US 6,284,365 B1
(45) Date of Patent: *Sep. 4, 2001

(54) COMPOSITE MATERIAL AND METHOD FOR PRODUCING THE SAME

(75) Inventors: Hidekazu Hirose; Yoshiyuki Ono; Katsuhiro Sato; Akira Imai, all of Minami-Ashigara (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/916,787

(22) Filed: Aug. 25, 1997

(30) Foreign Application Priority Data

| Aug. 26, 1996 | (JP) | ................................... 8-224237 |
| Nov. 8, 1996 | (JP) | ................................... 8-296565 |
| Feb. 17, 1997 | (JP) | ................................... 9-031857 |
| Aug. 11, 1997 | (JP) | ................................... 9-216769 |

(51) Int. Cl.[7] ................................... C09K 3/00
(52) U.S. Cl. ................... 428/333; 427/387; 427/399; 427/430.1; 428/404; 428/405; 428/420; 428/429; 428/447; 428/448; 428/451
(58) Field of Search ................... 427/387, 399, 427/430.1; 428/333, 420, 429, 447, 448, 451, 404, 405

(56) References Cited

U.S. PATENT DOCUMENTS 5,156,918 * 10/1992 Marks et al. ........................ 428/447
5,780,148 * 7/1998 Ohtake et al. ...................... 428/333

FOREIGN PATENT DOCUMENTS

A 2-110172  4/1990 (JP) .
A 5-117624  5/1993 (JP) .
A 6-214420  8/1994 (JP) .

OTHER PUBLICATIONS

Netzer, L. et al. "A New Approach to Construction of Artificial Monolayer Assemblies." *Journal of American Chemical Society*, v 105, pp. 674–676, 1983.
Sagiv, J. "Organized Monolayers by Adsorption. Formation and Structure of Oleophobic Mixed Monolayers on Solid Surfaces." *Journal of American Chemical Society*, v 102, pp. 92–98, 1980.

* cited by examiner

*Primary Examiner*—D. S. Nakarani
(74) *Attorney, Agent, or Firm*—Oliff & Berridge, PLC

(57) ABSTRACT

A method for producing a composite material, wherein compound A having a group selected from an aliphatic hydrocarbon group, aromatic hydrocarbon group and heterocycle-containing group which comprises a functional group which can bond to a compound B allowed to bond to a substrate, then compound B having a functional group which can bond to said functional group in compound A is allowed to bond to compound A is disclosed. Embodiments in which compound A is represented by formula (1); $R^1M^1Y^1_3$, formula (2); $R^1R^2M^1Y^1_2$, formula (3); $R^1R^2R^3M^1Y^1$ and formula (4); $R^1$—SH: embodiments in which compound A is a silane compound: the functional group of compound A is a halogen group or an epoxy group: and embodiments in which compound B is selected from aliphatic hydrocarbon compounds, aromatic hydrocarbon compounds and heterocycle-containing compounds having an amino group, carboxyl group or hydroxyl group, are preferred.

23 Claims, 27 Drawing Sheets

COMPOSITE MATERIAL AND METHOD FOR PRODUCING THE SAME

BACKGROUND OF THE INVENTION

1. Field of the Invention

The present invention relates to a composite material which is suitable for controlling the physical properties of the surface and interface of a solid article such as wettability, adhesive property, surface energy and the like, for improving dispersibility, chemical resistance and the like, for preventing adhesion of a contaminant, for preventing electrostatic charge, for imparting functions such as electrical conductivity, photoelectric conductivity, thermal conductivity and the like, and the like and which is available in a wide range of field including a paint, cosmetics, a protecting film for an electrical part and a mechanical part, a photoconductive material, a catalyst, a photo-semiconductor such as a photo-catalyst, a photoelectric conversion material and the like, a filler dispersion type composite building material, an additive for a toner, and the like, and a method which can produce the above-described composite material efficiently.

2. Description of the Related Art

As a method for producing a composite material in which a thin film is formed on a substrate, a casting method and a spin coating method are conventionally known. The casting method is one in which the composite material is produced by applying a solution prepared by dissolving a compound in an organic solvent and the like onto a substrate and evaporating the organic solvent. The spin coating method is one in which the composite material is produced by dropping a solution prepared by dissolving a compound in an organic solvent and the like onto a substrate revolving at high speed and by removing excess amount of the organic solvent.

However, in these methods, controlling of film thickness at molecular level and controlling of molecular orientation are difficult, and functions which a molecule inherently has cannot be manifested sufficiently.

As a method for producing a composite material which can control film thickness at molecular level and molecular orientation, Langmuir-Blodgett method (hereinafter referred to as LB method) is known. The LB method is one in which the composite material is produced by spreading molecules having a hydrophilic terminal group on the interface between a gas phase and a liquid phase (water), forming a thin film with keeping the area occupied by the spread molecules minimum, and transferring this thin film onto any substrate. Since water is generally used as the above-described liquid phase, the molecule having a hydrophilic terminal group is oriented so that the terminal group is directed to the liquid phase (water). In the LB method, to keep the area occupied by a molecule minimum, an instrument called a barrier is used to push one end of the interface between a gas phase and a liquid phase (water) to decrease the area occupied by molecules for increasing molecular density. By this procedure, a monolayer can be formed on the interface between a gas phase and a liquid phase. By transferring this monolayer onto a substrate, the composite material can be produced having a monolayer of which molecular orientation is controlled at molecular level.

However, though the LB method is an excellent method in view of molecular control, since bonding strength between the monolayer and the substrate in the resulted composite material is extremely weak, there are drawbacks that the composite material has poor mechanical strength, has weak heat resistance and is lacking in durability. As a result, even if a thin film composed of a functional molecule of which molecular orientation is controlled is formed on a substrate, the function thereof is not fully manifested. Further, like a casting method and a spin coating method, there is a problem that a thin film can not be formed on a substrate of which surface is not smooth such as a fine particle and the like, so that the shape of a composite material is restricted.

As a method which can solve the problems in the LB method and provides a composite material having excellent function, a chemical adsorption method is proposed. As the chemical adsorption method, for example, there is known a chemical adsorption method using a chemical adsorption molecule composed of a chlorosilane-based compound and the like suggested by J. Sagiv et al. [J. Sagiv et al., J. Ame. Chem. Soc., 1, 92 (1980), J. Sagiv et al., J. Am. Chem. Soc., 105, 674 (1980)]. Above-described chemical adsorption method is one in which the composite material is produced by forming a monolayer on a substrate by utilizing the condensation reaction of a reaction group exposed on the surface of the substrate, for example a hydroxyl group with a hydrolytic functional group on the end of an adsorbed molecule.

In the chemical adsorption method, the constituent molecule of the monolayer chemically reacts with the substrate to form a chemical bond such as —Si—O—, —Ge—O—, —Ti—O— and the like, and therefore, there can be produced the above-described composite material comprising a monolayer having high mechanical strength, excellent heat resistance and excellent durability. In the chemical adsorption method, an adsorption molecule having a thiol group can be used instead of the hydrolytic functional group. In this case, since the constituent molecule of a monolayer reacts with a substrate to form a covalent bond with —S—, the composite material comprising a monolayer having high mechanical strength, excellent heat resistance and excellent durability can be produced , similarly to the composite material using an adsorption molecule such as a silane-based compound, germanium-based compound, titanate-based compound and the like.

Further, in the case of the above-described chemical adsorption method, since a thin film can be formed also on a substrate of which surface is not smooth such as a fine particle and the like, a wide variety of shapes of the above-described composite material can be produced, and the composite material obtained can have a wide variety of applications.

Therefore, there have been attempts recently to produce the above-described composite material in which a functional molecule is introduced on the surface of a substrate by utilizing the chemical adsorption method. Japanese Patent Application Laid-Open (JP-A) Nos. 2-110172, 6-214420 and the like disclose , for example, a method in which the surface of a substrate is coated with an adsorbed molecule having an amino group (for example, γ-aminopropyltrimethoxysilane, γ-aminopropyltrimethoxysilane and the like), then this substrate is allowed to react with a functional molecule having a functional group (for example, acid chloride and the like) which can react with the amino group to produce a composite material in which the functional molecule is introduced into the substrate.

However, in this method, there is a problem that the amino group of the adsorption molecule and a hydroxyl group and the like on the surface of the substrate form a hydrogen bond and the function of the amino group is deteriorated, and therefore, only few functional molecules is allowed to react. As a result, the function of a thin film formed on the surface of the substrate can not be sufficiently improved.

Further, Japanese Patent Application Laid-Open (JP-A) No. 5-117624 discloses a method in which a functional group is introduced into a thin film using a silane-based adsorbed molecule having chlorosilyl groups on both end. However, in this case, there is a problem that a hydroxyl group and the like on the surface of the substrate strongly interacts with the reaction group (chlorosilyl group) of a main molecule which reacts with the functional molecule. Accordingly, only few functional molecules are introduced into the substrate. As a result, the function of a thin film formed on the surface of the substrate can not be sufficiently improved.

On the other hand, there is also an attempt in which functional groups are introduced into an adsorbed molecule. However, in this case, molecules to be adsorbed which can be synthesized are restricted due to difficulties in synthetic method. Therefore, function thereof is restricted, and the range of applications of the above-described composite material obtained becomes narrow. And, there is a problem that synthesis is difficult, molecules to be absorbed are synthesized via several synthetic steps due to difficulties in synthesis. As a result, the composite material can not produced at low cost.

SUMMARY OF THE INVENTION

The subject of the present invention is to solve the various problems in the prior art and to achieve the following objects.

Namely, the object of the present invention is to provide a composite material
  which is obtained by strongly bonding on the surface of a substrate a thin film in which functional molecules are introduced at high density and the functional molecules are oriented so as to expose the molecules on the surface,
  which is suitable for controlling the physical properties of the surface and interface of a solid article such as wettability, adhesive property, surface energy and the like, for improving dispersibility, chemical resistance and the like, for preventing adhesion of a contaminant, for preventing electrostatic charge, for imparting functions such as electrical conductivity, photoconductivity, thermal conductivity and the like, and
  which is applicable to a wide range of fields including a paint, cosmetics, a protecting film for an electrical component and a mechanical component, a photoconductive material, a catalyst, a photo-semiconductor such as a photo-catalyst, a photoelectric transfer material and the like, a filler dispersion type composite building material, an additive for a toner, and the like.

Another object of the present invention is to provide a method which can produce the composite material efficiently.

The above objects can be achieved by the following composite material and methods for producing the same.

A composite material comprising:
  a substrate, a compound A having a first functional group which bonds to the substrate and a second functional group which does not bond to the substrate, and a compound B which bonds to the second functional group.

A composite material wherein the first functional group is a hydrolytic functional group, a halogen atom or a hydrogen atom.

A composite material wherein the second functional group is a halogen atom or an epoxy group.

A composite material wherein compound A has a structure represented by one of the following formulae:

$$R^1 M^1 Y^1_3 \tag{1}$$

$$R^1 R^2 M^1 Y^1_2 \tag{2}$$

$$R^1 R^2 R^3 M^1 Y^1 \tag{3}$$

$$R^1 \!-\! SH \tag{4}$$

wherein $R^1$ represents a saturated or unsaturated aliphatic hydrocarbon group having 1–20 carbon atoms, an aromatic hydrocarbon group, or a heterocycle-containing group, including said second functional group; $R^2$ and $R^3$ each represents the same group as $R^1$ or a saturated or unsaturated aliphatic hydrocarbon group having 1–20 carbon atoms, an aromatic hydrocarbon group, or a heterocycle-containing group; $M^1$ represents a tetravalent element other than carbon atom; and $Y^1$ represents a hydrolytic group, a halogen atom or an alkoxy group.

DESCRIPTION OF THE PREFERRED EMBODIMENTS

Figure 1:
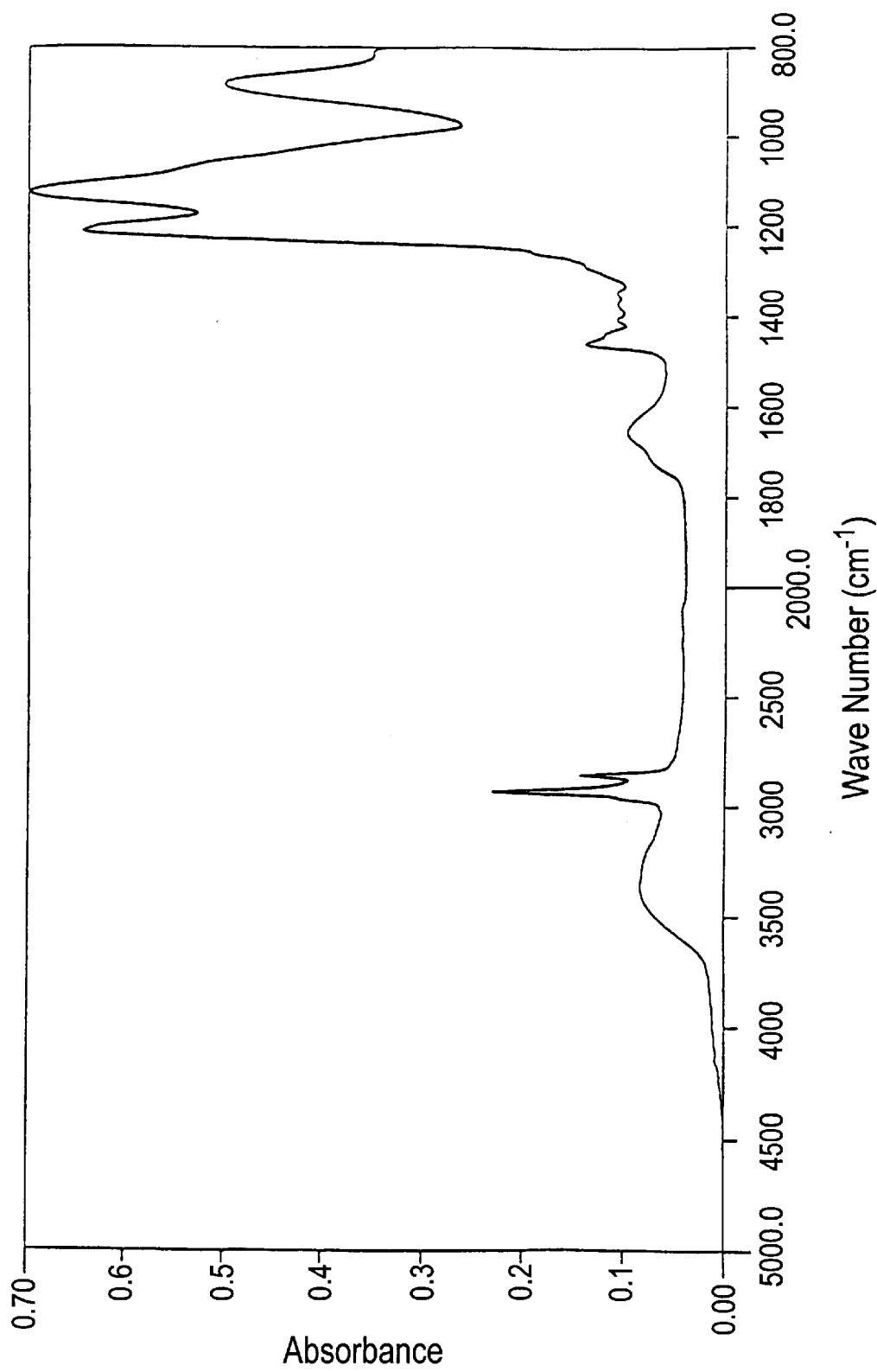
FIG. 1 is a drawing showing the data of a Fourier transform infrared absorption spectrum regarding a thin film in the composite material of Example 1.

The composite material of the present invention comprises a substrate and a thin film composed of a compound A on which a compound B is oriented on the outermost surface of the film placed on the substrate, and is produced by the method for producing a composite material of the present invention. The composite material of the present invention will be described below through the explanation of the method for producing a composite material of the present invention.

In the method for producing a composite material of the present invention, a reaction in which a compound A is bonded to a substrate (hereinafter, sometimes referred to as "reaction A") and a reaction in which a compound B is bonded to the compound A (hereinafter, sometimes referred to as "reaction B") are conducted.

In the method for producing a composite material of the present invention, the reaction A and the reaction B may be conducted in this order or in the reverse order, or may be conducted simultaneously. Among them, the embodiment in which the reaction A and the reaction B are conducted in this order.

(Substrate)

The substrate is not particularly restricted regarding its raw material, shape, structure, size and the like, and can be appropriately selected according to the use of the composite material and the like.

As the raw material of the substrate, metal, ceramics, glass, plastic, semiconductor and the like are generally listed. In these raw materials, the semiconductor is preferable, and, in particular, element semiconductor, oxide semiconductor and compound semiconductor are more preferable. Specific examples thereof preferably include titanium oxide, silicon oxide, germanium oxide, tin oxide, strontium titanate, barium titanate, magnesium titanate, calcium titanate, zinc oxide, tungsten oxide, strontium niobate, zirconium oxide, tantalum oxide, zinc sulfide, silicon, germanium and the like. In the present invention, a substrate containing any of titanium oxide, strontium titanate, silicon oxide and germanium oxide at least in the surface portion of the substrate is preferably used.

The shape of the substrate is generally a plate form and the like, and when the composite material is dispersed for use and the like, it may be a granular shape, or may be any other shapes. When the substrate is plate-shaped, the thickness thereof is not particularly restricted, and when the substrate is granular shaped, the average particle size thereof is not particularly restricted, and can be appropriately selected according to purposes for use.

(Compound A)

The compound A is a compound, having a group selected from the group consisting of an aliphatic hydrocarbon group, an aromatic hydrocarbon group and a heterocycle-containing group, which comprises a functional group which can bond to a compound B, preferably a functional group which can bond to the compound B after bonding to a substrate. Among them, a compound having a structure represented by any of the formulae (1): $R^1M^1Y^1_3$, (2): $R^1R^2M^1Y^1_2$, (3): $R^1R^2R^3M^1Y^1$ and (4): $R^1$—SH is preferred in the present invention.

$R^1$ represents a saturated or unsaturated aliphatic hydrocarbon group having 1 to 20 carbon atoms, aromatic hydrocarbon group or heterocycle-containing group which comprises the functional group. The number of the functional group in $R^1$ is not particularly restricted, and usually from about 1 to 3. It is preferable that the number of the functional group is larger, since the functional group reacts with compound B in a larger amount, and a larger amount of compound B can be introduced in the composite material.

$R^2$ and $R^3$ represent the same group as $R^1$ or a saturated or unsaturated aliphatic hydrocarbon group having 1 to 20 carbon atoms, aromatic hydrocarbon group or heterocycle-containing group. When $R^2$ and $R^3$ represent the same group as $R^1$, namely a saturated or unsaturated aliphatic hydrocarbon group having 1 to 20 carbon atoms aromatic hydrocarbon group or heterocycle-containing group, which comprises the functional group, $R^2$ and $R^3$ maybe the same as or different from $R^1$. Further, $R^2$ and $R^3$ may be the same or different from each other.

The specific examples of the functional group include a halogen group (halogen atom), epoxy group, ester group and the like. Among them, a halogen group (halogen atom) and epoxy group are preferred, and a halogen group (halogen atom) is particularly preferred in view of stability after bonding of the compound A with a substrate.

$M^1$ represents a tetravalent element other than carbon atom. The specific examples of M include Si, Ge, Sn, Ti, Zr and the like. Among them, Si and Ge are preferable and Si is particularly preferable.

$Y^1$ is a hydrolytic functional group representing a halogen atom or an alkoxy group. The examples of the halogen atom include fluorine, chlorine, bromine, and iodine. Among them, chlorine, bromine and iodine are preferred. The examples of the alkoxy group include a methoxy group, ethoxy group, normal or isopropoxy group and the like, and an isocyano group and the like.

The specific examples of the compounds represented by the above-described formulae (1) to (4) include p-bromophenyltrichlorosilane [p-BrPhSiCl$_3$], p-bromophenyltrimethoxysilane [p-BrPhSi(OCH$_3$)$_3$], o-bromophenyltrichlorosilane [o-BrPhSiCl$_3$], o-bromophenyltrimethoxysilane [o-BrPhSi(OCH$_3$)$_3$], m-bromophenyltrichlorosilane [m-BrPhSiCl$_3$], m-bromophenyltrimethoxysilane [m-BrPhSi(OCH$_3$)$_3$], (p-bromomethyl)phenyltrichlorosilane [p-BrCH$_2$PhSiCl$_3$], (p-bromomethyl)phenyltrimethoxysilane [p-BrCH$_2$PhSi(OCH$_3$)$_3$], bromomethyltrichlorosilane [BrCH$_2$SiCl$_3$], bromomethyltrichlorosilane [BrCH$_2$GeCl$_3$], bromomethyltrimethoxysilane [BrCH$_2$Si(OCH$_3$)$_3$], bromomethyltrimethoxygermane [BrCH$_2$Ge(OCH$_3$)$_3$], bromomethyltrimethoxysilane [BrCH$_2$Si(OCH$_2$CH$_3$)$_3$], bromomethyldimethylchlorosilane [BrCH$_2$Si(CH$_3$)$_2$Cl], bromomethyldimethylchlorosilane [BrCH$_2$Ge(CH$_3$)$_2$Cl], 2-bromomethyltrichlorosilane [CH$_3$CHBrSiCl$_3$], 2-bromomethyltrichlorosilane [CH$_3$CHBrGeCl$_3$], 1,2-dibromoethyltrichlorosilane [BrCH$_2$CHBrSiCl$_3$], 1,2-dibromoethyltrichlorogermane [BrCH$_2$CHBrGeCl$_3$], 3-bromomethyltrichlorosilane [Br(CH$_2$)$_3$GeCl$_3$], 4-bromobutyldimethylchlorosilane [Br(CH$_2$)$_4$Si(CH$_3$)$_2$Cl], 3-bromopropyltrichlorosilane [Br(CH$_2$)$_3$SiCl$_3$], 3-bromopropyltrimethoxysilane [Br(CH$_2$)$_3$Si(OCH$_3$)$_3$], 3-bromopropyltrimethoxysilane [Br(CH$_2$)$_3$Si(OCH$_2$CH$_3$)$_3$], 8-bromomethyltrichlorosilane [Br(CH$_2$)$_8$SiCl$_3$], 8-bromomethyltrimethoxysilane [Br(CH$_2$)BSi(OCH$_3$)$_3$], 8-bromomethyltrimethoxysilane [Br(CH$_2$)$_8$Si(OCH$_2$CH$_3$)$_3$], 8-bromobutyldimethylchlorosilane [Br(CH$_2$)$_8$Si(CH$_3$)$_2$ Cl], 11-bromomethyltrichlorosilane [Br(CH$_2$)$_{11}$SiCl$_3$], 11-bromophenyltrimethoxysilane [Br(CH$_2$)$_{11}$Si(OCH$_3$)$_3$], 11-bromomethyltrimethoxysilane [Br(CH$_2$)$_{11}$Si(OCH$_2$ CH$_3$)$_3$], 3-bromomethyltrichlorosilane [Br(CH$_2$)$_3$GeCl$_3$], bromomethyltrichlorosilane [BrCH$_2$GeBr$_3$], p-chlorophenyltrichlorosilane [p-ClPhSiCl$_3$], p-chlorophenyltrimethoxysilane [p-ClPhSi(OCH$_3$)$_3$], m-chlorophenyltrichlorosilane [m-ClPhSiCl$_3$], o-chlorophenyltrimethoxysilane [o-ClPhSi(OCH$_3$)$_3$], (p-chloromethyl)phenyltrichlorosilane [p-ClCH$_2$PhSiCl$_3$], (p-chloromethyl)phenyltrimethoxysilane [p-ClCH$_2$PhSi(OCH$_3$) 3], (p-chloromethyl)phenylmethyldichlorosilane [p-ClCH$_2$PhSi(CH$_3$)Cl$_2$], (p-chloromethyl)phenyldimethylchlorosilane [p-ClCH$_2$PhSi(CH$_3$)$_2$Cl], (p-chloromethyl)phenyltrin-propoxysilane [p-ClCH$_2$PhSi(O-n-C$_3$H$_7$)$_3$], ((p-chloromethyl)phenylethyl)trichlorosilane [p-ClCH$_2$Ph(CH$_2$)$_2$SiCl$_3$], ((p-chloromethyl)phenylethyl)methyldichlorosilane [p-ClCH$_2$Ph(CH$_2$)$_2$Si(CH$_3$)Cl$_2$], ((p-chloromethyl)phenylethyl)dimethylchlorosilane [p-ClCH$_2$Ph(CH$_2$)$_2$Si(CH$_3$)$_2$Cl], ((p-chloromethyl)phenylethyl)trimethoxysilane [p-ClCH$_2$Ph(CH$_2$)$_2$Si(OCH$_3$)$_3$], ((m-chloromethyl)phenylethyl)trichlorosilane [m-ClCH$_2$Ph(CH$_2$)$_2$SiCl$_3$], ((m-chloromethyl)phenylethyl)methyldichlorosilane [m-ClCH$_2$Ph(CH$_2$)$_2$Si(CH$_3$)Cl$_2$], ((m-chloromethyl)phenylethyl)dimethylchlorosilane [m-ClCH$_2$Ph(CH$_2$)$_2$Si(CH$_3$)$_2$Cl], ((m-chloromethyl)phenylethyl)trimethoxysilane [mClCH$_2$Ph(CH$_2$)$_2$Si(OCH$_3$)$_3$], (o-chloromethyl)phenylethyl)trichlorosilane [o-ClCH$_2$Ph(CH$_2$)$_2$SiCl$_3$], ((o-chloromethyl)phenylethyl)methyldichlorosilane [o-ClCH$_2$Ph(CH$_2$)$_2$Si(CH$_3$)Cl$_2$], ((o-chloromethyl)phenylethyl)dimethylchlorosilane [o-ClCH$_2$Ph(CH$_2$)$_2$Si(CH$_3$)$_2$Cl], ((o-chloromethyl)phenylethyl)trimethoxysilane [o-ClCH$_2$Ph(CH$_2$)$_2$Si(OCH$_3$)$_3$], trichloromethyltrichlorosilane [Cl$_3$CSiCl$_3$], chloromethyltrichlorosilane [ClCH$_2$SiCl$_3$], chloromethyltrichlorosilane [ClCH$_2$GeCl$_3$], chloromethyltrimethoxysilane [ClCH$_2$Si(OCH$_3$)$_3$], chloromethyltrimethoxysilane [ClCH$_2$Si(OCH$_2$CH$_3$)$_3$], chloromethyltrimethoxysilane [ClCH$_2$Ge(OCH$_3$)$_3$], chloromethyldimethylchlorosilane [ClCH$_2$Si(CH$_3$)$_2$Cl], chloromethylmethyldichlorosilane [ClCH$_2$Si(CH$_3$)Cl$_2$], chloromethylmethyldichlorosilane [ClCH$_2$Si(CH$_3$)(OCH$_2$CH$_3$)$_2$]. chloromethylmethyldiisopropoxysilane [ClCH$_2$Si(CH$_3$)(OCH(CH$_3$)$_2$)$_2$], bis(chloromethyl)dichlorosilane [(ClCH$_2$)$_2$ SiCl$_2$], bis(chloromethyl)methyldichlorosilane [(ClCH$_2$)$_2$ SiCH$_3$Cl], 1-chloromethyltrichlorosilane [ClCHCH$_3$SiCl$_3$], 1,2-dichloroethyltrichlorosilane [CH$_2$ClCHClSiCl$_3$], (dichloromethyl)trichlorosilane [CHCl$_2$SiCl$_3$], (dichloromethyl)methyldichlorosilane [CHCl$_2$Si(CH$_3$)Cl$_2$], (dichloromethyl)dimethylchlorosilane [CHCl$_2$Si(CH$_3$)$_2$Cl], 2-chloroethyltrichlorosilane [Cl(CH$_2$)$_2$SiCl$_3$], 2-chloroethyltriethoxysilane [Cl(CH$_2$)$_2$Si(OCH$_2$CH$_3$)$_3$], 2-chloroethylmethyldichlorosilane [Cl(CH$_2$)$_2$SiCl$_2$CH$_3$], 2-chloroethylmethyldimethoxysilane [Cl(CH$_2$)$_2$Si(OCH$_3$)$_2$CH$_3$], 2-(chloromethyl)allyltrichlorosilane [CH$_2$=C(CH$_2$Cl)SiCl$_3$], 1-(chloromethyl)allyltrichlorosilane [CH(CH$_2$Cl)=CH$_2$SiCl$_3$], 3-chloropropyltrichlorosilane [Cl(CH$_2$)$_3$ SiCl$_3$], 3-chloropropyltrichlorosilane [Cl(CH$_2$)$_3$GeCl$_3$], 3-chloropropyldimthylchlorosilane [Cl(CH$_2$)$_3$Si(CH$_3$)$_2$Cl], 3-chloropropyldimthylchlorosilane [Cl(CH$_2$)$_3$Ge(CH$_3$)$_2$Cl], 3-chloropropylmethyldichlorosilane [Cl(CH$_2$)$_3$Si(CH$_3$)Cl$_2$], 3-chloropropylmethyldichlorosilane [Cl(CH$_2$)$_3$SiPhCl$_2$], 3-chloropropyldimthylchlorosilane [Cl(CH$_2$)$_3$Si(CH$_3$)$_2$(OCH$_3$)], 3-chloropropyltrimethoxysilane [Cl(CH$_2$)$_3$Si(OCH$_3$)$_3$], 3-chloropropyltrimethoxysilane [Cl(CH$_2$)$_3$Si(OCH$_2$CH$_3$)$_3$], 3-chloropropylmetyldimethoxysilane [Cl(CH$_2$)$_3$SiCH$_3$(OCH$_3$)$_2$], 3-chloropropylmetyldimethoxysilane [Cl(CH$_2$)$_3$SiCH$_3$(OCH$_2$CH$_3$)$_2$], 4-chlorobutyl dimethylchlorosilane [Cl(CH$_2$)$_4$SiCl(CH$_3$)$_2$], 8-chloromethyltrichlorosilane [Cl(CH$_2$)$_8$SiCl$_3$], 8-chloropropyltrimethoxysilane [Cl(CH$_2$)$_8$Si(OCH$_3$)$_3$], 8-chloroethyltriethoxysilane [Cl(CH$_2$)$_8$Si(OCH$_2$CH$_3$)$_3$], p-iodophenyltrichlorosilane [p-IPhSiCl$_3$], p-iodophenyltrimethoxysilane [p-IPhSi(OCH$_3$)$_3$], (p-iodomethyl)phenyltrichlorosilane [p-ICH$_2$PhSiCl$_3$], (p-iodomethyl)phenyltrimethoxysilane [p-ICH$_2$PhSi(OCH$_3$)$_3$], iodomethyltrichlorosilane [ICH$_2$SiCl$_3$], iodomethyltrimethoxysilane [ICH$_2$Si(OCH$_3$)$_3$], iodomethyltrimethoxysilane [ICH$_2$Si(OCH$_2$CH$_3$)$_3$],
3-iodopropyltrichlorosilane [I(CH$_2$)$_3$SiCl$_3$],
3-iodopropyltrimethoxysilane [I(CH$_2$)$_3$Si(OCH$_3$)$_3$],
3-iodopropyltrimethoxysilane [I(CH$_2$)$_3$Si(OCH$_2$CH$_3$)$_3$],
8-iodooctyltrichlorosilane [I(CH$_2$)$_8$SiCl$_3$],
8-iodomethyltrimethoxysilane [I(CH$_2$)$_8$Si(OCH$_3$)$_3$],
8-iodooctyltrichlorosilane [I(CH$_2$)$_8$Si(OCH$_2$CH$_3$)$_3$],
(3-glycidyloxypropyl)trimethoxysilane [CH$_2$OCHCH$_2$—O—(CH$_2$)$_3$Si(OCH$_3$)$_3$], acetoxyethyltrichlorosilane [CH$_3$COOCH$_2$CH$_2$SiCl$_3$], acetoxyethyltriethoxysilane [CH$_3$COOCH$_2$CH$_2$Si(OCH$_2$CH$_3$)$_3$], acetoxyethyltrimethoxysilane [CH$_3$COOCH$_2$CH$_2$Si(OCH$_3$)$_3$],
3-bromopropylthiol [Br(CH$_2$)$_3$SH], 8-bromoethylthio [Br(CH$_2$)$_8$SH], 11-bromoundecylthiol [Br(CH$_2$)$_{11}$SH], p-bromophenylthiol [p-BrPhSH], o-bromophenylthiol [o-BrPhSH], m-bromophenylthiol [m-BrPhSH], (p-bromomethyl)phenylthiol [p-BrCH$_2$PhSH], 3-chloropropylthiol [Cl(CH$_2$)$_3$SH], 8-chlorooctylthiol [Cl(CH$_2$)$_8$SH], p-chlorophenylthiol [p-ClPhSH], o-chlorophenylthiol [o-ClPhSH], m-chlorophenylthiol [m-ClPhSH], (p-chloromethyl)phenylthiol [p-ClCH$_2$PhSH], 3-iodopropylthiol [I(CH$_2$)$_3$SH], 8-iodooctylthiol [I(CH$_2$)$_8$SH], p-iodophenylthiol [p-IPhSH], m-iodophenylthiol [m-IPhSH], (piodomethyl)phenylthiol [p-ICH$_2$PhSH] and the like. In these formulae, "Ph" represents a phenyl group.

Among the above-described compounds, silane compounds are preferable in view of easy synthesis, high strength and a variety of kinds.

Further, among the above-described compounds, three $Y^1$s in the compounds corresponding to the above-described formula (1), two $Y^1$s and $R^2$ in the compounds corresponding to the formula (2) in which $R^2$ is the same as $R^1$, and $Y^1$ and $R^2$ and $R^3$ in the compounds corresponding the formula (3) in which $R^2$ and $R^3$ are the same as $R^1$, respectively, can bond to hydroxyl groups and the like on the surface of the substrate. Accordingly, such compounds have an advantage that bonding strength of compound A per one molecule with the substrate can be increased.

Further, among the above-described compounds, $Y^1$ and $R^2$ in the compounds corresponding to the formula (2) in which $R^2$ is a saturated or unsaturated aliphatic hydrocarbon group having 1 to 20 carbon atoms, aromatic hydrocarbon group or heterocycle-containing group, and only $Y^1$ in the compounds corresponding to the above-described formula (3) in which $R^2$ and $R^3$ are a saturated or unsaturated aliphatic hydrocarbon group having 1 to 20 carbon atoms, aromatic hydrocarbon group or heterocycle-containing group, respectively, can bond to a hydroxyl group and the like on the surface of the substrate. Accordingly, the compounds have an advantage that the number of bonding of compound A per one molecule with the substrate can be decreased, and larger amount of the compound A can be introduced into the surface of the substrate, and a composite material having more variety of functions can be obtained.

Compound A may be used alone or in combination of two or more. The former case is advantageous for improving the stability and uniformity of the functions of the composite material, and the latter case is advantageous for making the composite material multi-functional.

(Compound B)

Compound B is not particularly restricted provided that the compound B is a functional molecule having at least one functional group which can bond to the functional group (functional group which can bond to the compound B) in compound A, and can be appropriately selected according to the use of the composite material and the like. The examples thereof include a saturated or unsaturated aliphatic hydrocarbon compound, aromatic hydrocarbon compound or heterocycle-containing compound, which comprises an amino group; a saturated or unsaturated aliphatic hydrocarbon compound, aromatic hydrocarbon compound or heterocycle-containing compound, which comprises a carbonyl group; a saturated or unsaturated aliphatic hydrocarbon compound, aromatic hydrocarbon compound or heterocycle-containing compound which comprises a carboxyl group; a saturated or unsaturated aliphatic hydrocarbon compound, aromatic hydrocarbon compound or heterocycle-containing compound which comprises a hydroxyl group; or a phosphine compound and the like.

Among them, a saturated or unsaturated aliphatic hydrocarbon compound, aromatic hydrocarbon compound or heterocycle-containing compound, which comprises ruthenium, is advantageous, since such a compound provides electro conductivity, photoelectroconductivity, thermal conductivity, and many functions as an energy conversion material such as a photoconductive material, catalyst, photocatalyst, photophoto conversion material, photoelectro-conversion material and the like, and multiple functions can be imported to the composite material.

Specific examples of the above-described compound B include compounds having an amino group such as ammonia, isobutylamine, stearylamine, m-chloroaniline, p-chloroaniline, aniline, N-methylaniline, o-toluidine, diphenylamine, dicyclohexylamine, ethyleneimine, p-phenylenediamine, o-phenylenediamine, m-phenylenediamine, p-nitroaniline, o-nitroaniline, m-nitroaniline, pyrrole, 1-aminopyrrole, pyridine, phenothiazine, 1-aminoanthraquinone, 2-aminoanthraquinone, 1-aminoanthracene, 2-aminoanthracene, 3-aminobiphenyl, 4-aminobiphenyl, benzidine, 2-naphthylamine, 2-aminopyridine, benzylamine, ethylenediamine, thionyl, azule B, 4-aminodiazobenzene, 4-amino-4'-nitrostilbene, 4-amino-4'-cyanostilbene, 4-aminostilbene, -1,5-diaminonaphthalene, 1,8-diaminonaphthalene, 2,3-diaminonaphthalene, 2-aminobenzothiazol, aminocyclobutane, 1-aminopyrene, 4-amino-p-terphenyl, 4-aminothiophenol, 2-aminofluorene, 2,7-diaminofluorene, 1-amino-9-fluorenone, 2-amino-9-fluorenone, 4-amino-9-fluorenone, 2-aminobenzophenone, 4-aminobenzophenone, 4,4'-bis(4-aminophenoxy)biphenyl, 2,2'-dipyridylamine, carbazol, amine compounds of a phthalocyaninedye and the like having an amino group such as (tetraaminophthalocyanato)cobalt (II), (tetraaminophthalocyanato)copper (II), (tetraaminophthalocyanato)nickel (II) and the like, and the like; and acetic acid, 2-ethylhexanoic acid, stearic acid, benzoic acid, m-chlorobenzoic acid, p-chlorobenzoic acid, p-methylbenzoic acid, 1-naphthylacetic acid, 2-naphthoic acid, phthalic acid, terephthalic acid, pyromellitic acid, p-nitrobenzoic acid, o-nitrobenzoic acid, m-nitrobenzoic acid, 1-carboxypyrrole, 2-carboxyanthraquinone, 1-carboxyanthracene, 2-carboxyanthracene, 3-carboxybiphenyl, 4-carboxybiphenyl, N,N'-di(3-carboxyphenyl)-N,N'-di(3-methylphenyl)benzidine, N,N'-di(4-carboxyphenyl)-N,N'-di(3-methylphenyl)benzidine, N,N'-di(4-carboxyphenyl)-N,N'-di(4-methylphenyl) benzidine, benzylamine, ethylenediamine, 4-carboxystilbene, 2-carboxybenzothiazol, 1-carboxypyrene, 4-carboxy-p-terphenyl, 4-carboxythiophenol, 2-carboxyfluorene, 4-carboxy-9-fluorenone, 3-carboxy-9-fluorenone, 4-carboxybenzophenone, 3-carboxy-carbazol; xanthenedyes such as fluorescein, 4',5'-dibromofluorescein, 2',7'- dibromofluorescein, 2',4',5',7'-tetrabromofluorescein, 4',5'-dichlorofluorescein, 2',7'-dichlorofluorescein, 2',4',5',7'-tetrachlorofluorescein, 4',5'-diiodofluorescein, 2',7'-diiodofluorescein, 2',4',5',7'-tetraiodofluorescein, 4-carboxyfluorescein, 5-carboxyfluorescein, 4',5'-diiodofluorescein, 4',5'-dinitrofluorescein, 4-aminofluorescein, 5-aminofluorescein, 4,5,6,7-tetrachlorofluorescein, 4-(iodoacetoamide)fluorescein, 4-carboxy-2',4',5',7'-tetraiodofluorescein and the like; Rhodaminedyes such as Rhodamine B, Rhodamine 123 and the like; phthalocyaninedyes such as (tetracarboxyphthalocyanato)cobalt (II), (tetracarboxyphthalocyanato)copper (II), (tetracarboxyphthalocyanato)iron (II), (tetracarboxyphthalocyanato)nickel (II) and the like; merocyaninedyes such as 3-allyl-1-carboxymethyl-5-[2-(1-ethylnaphto[1,2-d]oxazol-2(1H)-ylidene)ethylidene]-2-thiohydanthione and the like; compounds having a carboxyl group such as acid anhydrides such as phthalic anhydride, pyromellitic dianhydride, 1,8-naphthalic anhydride, 1,2-naphthalic anhydride, 1,4,5,8-naphthalic dianhydride, 3,4,9,10-perylenetetracarboxylic dianhydride and the like; compounds having a hydroxyl group such as phenol, 1-naphthol, 2-naphthol, p-hydroxybiphenyl, 7-hydroxycumarin, 2-hydroxycarbazol, 2-hydroxyfluorenone, 4-hydroxyindol, 2-hydroxy-1,4-naphtoquinone, 1-hydroxypyrene, 9-(2-methoxycarbonylphenyl)-6-hydroxy-3H-xanthene-3-ene, 2,4,5,7-tetraiodo-9-(2-methoxycarbonylphenyl)-6-hydroxy-3H-xanthene-3-ene, 2,4,5,7-tetrabromo-9-(2-methoxycarbonylphenyl)-6-hydroxy-3H-xanthene-3-ene and the like; compounds containing a ruthenium element such as tris(2,2-bipyridyl-4,4'-dicarboxylate)ruthenium (II), tris(2,2-bipyridyl-4,4'-diamino)ruthenium (II), ruthenium(2,2-bipyridyl-4,4'-di-4,4'-dicarboxylate)$_2$($\mu$-(cyano)ruthenium (cyano)(2,2-bipyridyl)$_2$)$_2$, cis-di(tiocyanate)bis(2,2-bipyridyl-4,4'-di-4,4'-dicarboxylate)ruthenium (II), ruthenium(2,2-bipyridyl-4,4'-di-4,4'-diamino)$_2$($\mu$-(cyano) ruthenium(cyano)(2,2-bipyridyl)$_2$)$_2$, cis-di(tiocyanate)bis(2,2-bipyridyl-4,4'-di-4,4'-dicarboxylate)ruthenium (II), cis-dicyanobis(2,2-bipyridyl-4,4'-di-4,4'-dicarboxylate) ruthenium (II), cis-dicyanobis(2,2-bipyridyl-4,4'-di-4,4'-diamino)ruthenium (II), cis-dibromobis(2,2-bipyridyl-4,4'-di-4,4'-dicarboxylate)ruthenium (II), cis-dichlorobis(2,2-bipyridyl-4,4'-di-4,4'-dicarboxylate)ruthenium (II), cis-diiodobis(2,2-bipyridyl-4,4'-di-4,4'-dicarboxylate) ruthenium (II) and the like; and the like.

Among the above-described compounds B, the compounds having an amino group, the compounds having a carboxyl group and the compounds having a hydroxyl group are preferred in view of suitable reactivity with compound A and wide selectivity as a functional molecule. Among these compounds, the compounds further having a ruthenium element are more preferable. More specifically, compounds selected from aliphatic hydrocarbon compounds, aromatic hydrocarbon compounds and heterocyle-containing compounds, having an amino group; aliphatic hydrocarbon compounds, aromatic hydrocarbon compounds and heterocyle-containing compounds, having a carboxyl group; and aliphatic hydrocarbon compounds, aromatic hydrocarbon compounds and heterocyle-containing compounds having a hydroxyl group are preferred. Among these compounds, the compounds further having a ruthenium element are more preferable.

Compound B may be used alone or in combination of two or more. The former case is advantageous in view of the stability and uniformity of the functions of the composite material, and the latter case is advantageous since multiple functions can be imparted to the composite material.

The preferable combination of compound B with compound A differs depending on the use of the composite material and the like and can not generally be prescribed. However, in view of the heat resistance and durability of the composite material, it is preferable to use as the compound B a compound selected from aliphatic hydrocarbon compounds, aromatic hydrocarbon compounds and heterocyle-containing compounds, having an amino group, aliphatic hydrocarbon compounds, aromatic hydrocarbon compounds and heterocyle-containing compounds, having a carboxyl group and aliphatic hydrocarbon compounds, aromatic hydrocarbon compounds and heterocyle-containing compounds, having a hydroxyl group and to use as the compound A a silane compound having the above-described functional group, since the respective charateristics can be exerted simultaneously.

It is advantageous to use as the compound B a saturated or unsaturated aliphatic hydrocarbon compound, aromatic hydrocarbon compound or heterocyle-containing compound, which comprises a ruthenium element, since the compound can provide electroconductivity, photoelectroconductivity, thermal conductivity, and many functions as an energy conversion material such as a photoelectricconductive material, catalyst, photocatalyst, photo-photo conversion material, photoelectric conversion material and the like, and multiple functions can be imparted to the composite material. Further, the above-described compound having a ruthenium element is excellent in that it is stable to heat, light and the like and it can provide wide variety of uses as a composite material, and also in that a composite material having variety of functions can be obtained even if the above-described compound is used alone, the production process can be simplified, and the production cost can be reduced.

(Reaction A)

The above-described reaction A can be conducted by contacting the substrate with a solvent containing at least one of the compound A.

As a result of the reaction A, the compound A bonds to the surface of the substrate, and a thin film composed of the compound A is formed on the substrate. Since the bond is, for example, a chemical bond such as —M'—O—, —S— and the like, the substrate bonds to the compound A firmly, and the thin film composed of the compound A is not easily separated from the substrate.

In this reaction, a group in the compound A which bonds to the substrate is the group containing a functional group which can bond to the compound B, except for the groups selected from aliphatic hydrocarbon groups, aromatic hydrocarbon groups and heterocycle-containing groups. Namely, the group is not $R^1$ but $Y^1$ or —SH in the above-described formulae (1) to (4). The groups selected from aliphatic hydrocarbon groups, aromatic hydrocarbon groups and heterocycle-containing groups which comprise a functional group which can bond to the compound B have a week interaction with the substrate as compared with the other groups in the compound A. Accordingly, such groups does not substantially react with the substrate, and the functional group reacts with the compound B in the reaction B.

The examples of the above-described solvent include organic solvents, for example, hydrocarbon-based solvents, ester-based solvents, ether-based solvents, halogen-based solvents, alcohol-based solvents, and water, or mixed solvents thereof.

The examples of the hydrocarbon-based solvents include toluene, benzene, xylene, hexane, octane, hexadecane, cyclohexane and the like.

The examples of the ester-based solvents include methyl acetate, ethyl acetate, isopropyl acetate, amyl acetate and the like.

The examples of the ether-based solvents include dibutyl ether, dibenzyl ether and the like.

The examples of the halogen-based solvents include 1,1-dichloro, 1-fluoroethane, 1,1-dichloro, 2,2,2-trifluoroethane, 1,1-dichloro, 2,2,3,3,3-pentafluoropropane, chloroform, dichloroethane, carbon tetrachloride and the like.

The examples of the alcohol-based solvent include methanol, ethanol, i-propyl alcohol and the like.

In the present invention, in addition to these solvents, solvents such as dimethylformamide, dimethylacetoamide, dimethylsulfoxide, acetic acid, sulfuric acid and the like may be used. The examples of the water include tap water, distilled water, pure water and the like.

Among these solvents, the solvents used in Examples, which will be described hereinafter, are preferred, and toluene, hexane, hexadecane and the like are preferable since excellent treating efficiency is obtained and a clean thin film can be formed on the substrate.

The content of the compound A in the solvent containing at least one of the compound A is, for example, from about $1.0 \times 10^{-4}$ to 10 mol/l and preferably from $1.0 \times 10^{-4}$ to $100 \times 10^{-4}$ mol/l in general.

It is not preferable that the content is less than $1.0 \times 10^{-4}$ mol/l, since a long time is required for the immersion treatment of the substrate, and that the content exceeds 10 mol/l, since the compounds A may react each other, and a clean thin film may not be formed on the substrate.

The above-described contact can be conducted, for example, by immersing the substrate into the above-described solvent (hereinafter, sometimes referred to as "solution A") containing at least one of the compound A, spraying the solvent A onto the substrate, or applying the solvent A on the substrate by a casting method.

Among them, the contact is preferably conducted by immersing the substrate into the solution A from the view points of operation efficiency and simplicity.

The time period for which the above-described solution A is brought into contact with the substrate is usually from about several minutes to 1 week, and preferably from 30 minutes to 1 day.

When the time period is less than several minutes, the treatment becomes insufficient, and the introduction of the compound A into the substrate maybe insufficient. On the other hand, when the period exceeds 1 week, effect in proportion to the period can n ot be obtained, and treating efficiency is low, therefore, neither case is preferred.

In order to accelerate and promote the reaction A efficiently, it is effective to conduct heating at a temperature from about 30 to 120° C., or to apply ultrasonic wave during contacting. Also, it is effective to wash the substrate or to conduct plasma treatment and corona discharge treatment to the substrate before contacting.

Further, the compound A may be singly evaporated to bring the compound A into contact with the substrate. Alternatively, the vapor of the compound A may be mixed with a carrier gas (for example, nitrogen , argon and the like) to bring the compound A into contact with the substrate.

The substrate may be washed, for example, with an organic solvent such as methanol, ethanol, i-propyl alcohol and the like, with an aqueous solution of an acid such as HF, HCl and the like, with an aqueous solution of alkali such as $NH_4OH$ and the like, with $UV/O_3$ or with combination thereof.

After the reaction A, the substrate may be washed with an organic solvent such as n-hexane, decane, toluene, acetone, methanol, ethanol and the like for removing unreacted compound A. The substrate may be heated to strengthen the bond between the compound A and the substrate. In other words, the substrate may be heated in order to sufficiently complete the reaction of the compound A with the substrate.

(Reaction B)

The reaction B can be suitably conducted by contacting a solvent (hereinafter, sometimes referred to as "solution B") containing at least one of the compound B with the substrate with the compound A bonded to the surface of the substrate. However, for example, the solution A may be brought into contact with the solution B before they are brought into contact with the substrate, or the solution A, the solution B and the substrate may be brought into contact with each other simultaneously, as occasion demands.

By the reaction B, the functional group in the compound B which can bond to the functional group in compound A, and the functional group of the group selected from the aliphatic hydrocarbon group, aromatic hydrocarbon group and heterocycle-containing group, which comprises the functional group in the compound A are mutually interacted with each other, so that the functional group in the compound B is bonded to the position to which the functional group in the compound A has been bonded. As a result, the compound A bonds to the compound B, and at least one of the compound B is introduced into the thin film composed of the compound A formed on the substrate.

The solvent is the same as that used in the reaction A. And the contact is the same as that in the reaction A.

The time period for which the solution B is brought into contact with the substrate is usually from about several minutes to 1 week, and preferably from 30 minutes to 1 day.

When the time period is less than several minutes, the treatment becomes insufficient, and the introduction of the compound B into the substrate maybe insufficient. On the other hand, when the period exceeds 1 week, effect in proportion to the period can not be obtained, and treating efficiency is low, therefore, neither case is preferred.

In order to accelerate and promote the reaction B efficiently, it is effective to conduct heating at a temperature from about 30 to 120° C., or to apply ultrasonic wave during contacting. Also, after the reaction B, for example, the substrate can be washed with an organic solvent such as acetone, methanol, ethanol and the like, and can be dried in an inert gas such as nitrogen and the like, for removing unreacted compound B. When ammonia is used as compound B, it is preferable to conduct treatment with NaOH after the reaction B for preventing formation of a salt. Further, the compound B may be evaporated and brought into contact with the substrate.

By the reaction A and reaction B, a thin film composed of compound A is formed on the substrate, and the compound B which is a functional molecule is efficiently introduced on the surface of the thin film at a high density.

In the method for producing the composite material of the present invention, though a solvent containing compound A and a solvent containing the compound B may be prepared separately before conducting the reaction A and the reaction B as described above. It is also permitted to prepare a solvent containing the compound A and the compound B to bring this solvent into contact with the substrate.

The composite material of the present invention can be suitably used for controlling the physical properties of the surface and interface of a solid such as wettability, adhesive property, surface energy and the like, for improving dispersibility, chemical resistance and the like, for preventing adhesion of a contaminant, for preventing electrostatic charge, for imparting functions such as electrical conductivity, photoelectric conductivity, thermal conductivity and the like, since the composite material is obtained by introducing functional molecules at a high density to firmly bond, to the surface of a substrate, a thin film in which the functional molecules are oriented so as to expose the functional molecules on the surface thereof. The composite material of the present invention can be utilized in a wide range of field including a paint, cosmetics, a protecting film for an electrical component and a mechanical component, a photoelectric conductive material, a catalyst, a photo-semiconductor such as a photo-catalyst, a photoelectric converting material and the like, a filler dispersion type composite building material, an additive for a toner, and the like.

EXAMPLES

The following examples further illustrate the composite material and the method for producing the same of the present invention, but are not to be construed to limit the scope thereof.

Example 1 n-hexadecane and carbon tetrachloride were mixed in a ratio (by volume) of 4:1, and the resulting mixed solvent was filtered through a microfilter, then, 8-bromooctyltrichlorosilane [8-Br(CH$_2$)$_8$SiCl$_3$] which is a compound A was dissolved in this mixed solvent to prepare a solution of 8-bromooctyltrichlorosilane having a concentration of 10$^{-3}$ mol/l. This solution is referred to as solution A.

As a substrate, an Si (100) single crystal substrate (manufactured by Sumitomo Sitic K.K., plate shape, p type, resistance; 5.0 to 30.0 Ωcm) was used, and it was washed with acetone, i-propyl alcohol and ethyl alcohol before use. Silicon oxide was contained in the surface of this substrate.

This substrate was immersed in the above-described solution A for 2 hours.

Then, the substrate was washed with n-hexadecane and acetone, and naturally dried under nitrogen atmosphere, then heated at a temperature of 80° C. for 30 minutes.

To confirm whether 8-bromooctyltrichlorosilane bonded to the surface of the substrate or not, Fourier transform infrared absorption spectrum measurement (hereinafter, sometimes referred to as "FT-IR measurement", System 200 manufactured by Perkin Elmer Corp.) and X-ray photoelectron spectral measurement (hereinafter, sometimes referred to as "XPS measurement", ESCA LAB-220i manufactured by VG Corp.) were carried out.

As a result of the above-described FT-IR measurement, as shown in the spectrum data of FIG. 1, signals due to symmetric stretch vibration and anti-symmetric stretch vibration of a —CH$_2$— group were observed around 2840 to 2930 cm$^{-1}$, a signal due to stretch vibration of an Si—C group was observed around 1240 cm$^{-1}$, and a signal due to skeltal vibration of an Si—O—Si group was observed around 1080 cm$^{-1}$.

Figure 2:
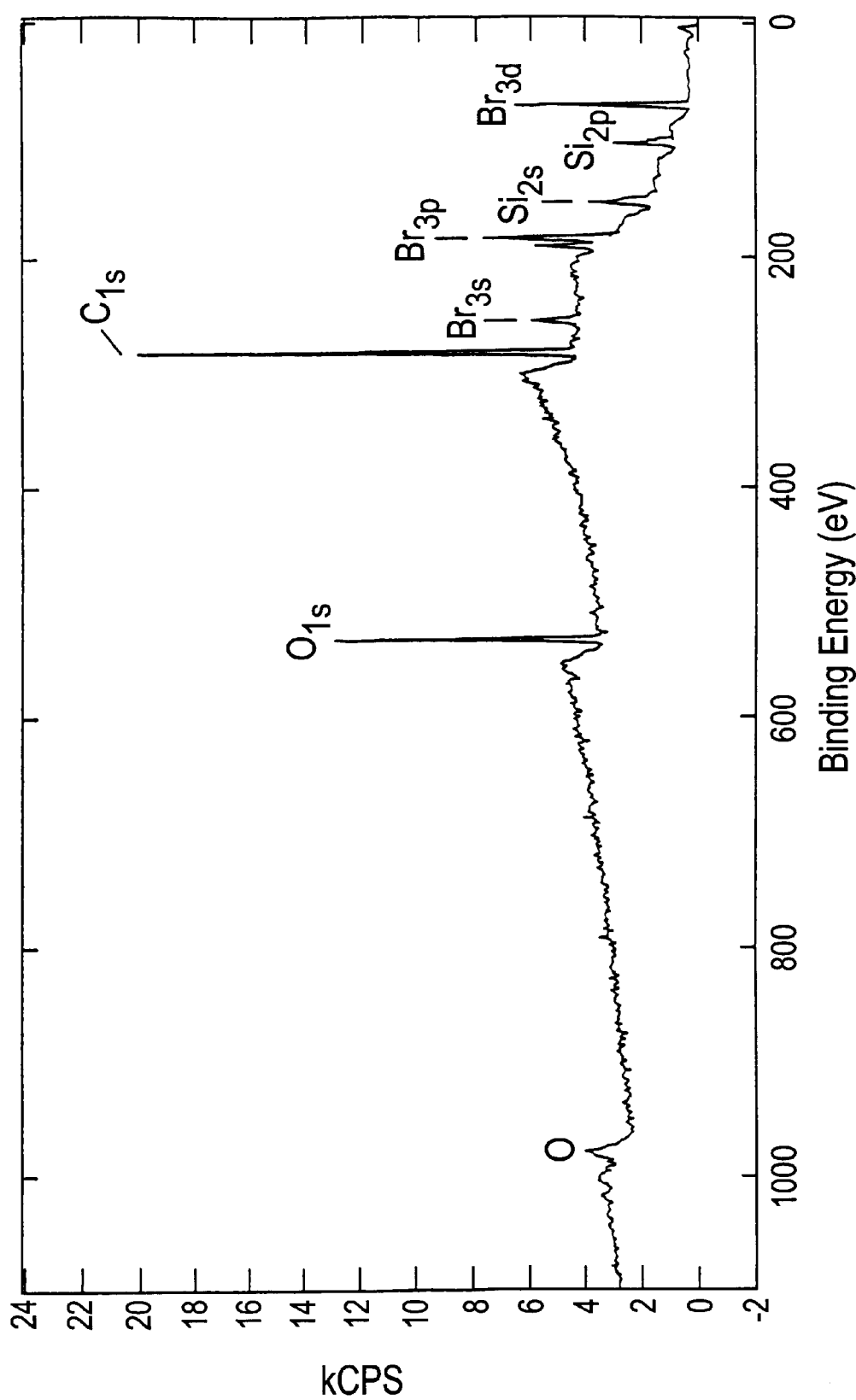
FIG. 2 is a drawing showing a data of an X-ray photoelectron spectrum regarding a thin film in the composite material of Example 1.

As a result of the above-described XPS measurement, as shown in the spectrum data of FIG. 2, a signal of 3d around 70 eV, a signal of 3p around 180 eV and a signal of 3s around 256 eV from a Br atom were observed. A signal from a Cl atom was not simultaneously observed, therefore, it was confirmed that de-hydrochloric acid reaction has occurred.

From the above-described data, it was confirmed that 8-bromooctyltrichlorosilane bonded to the substrate.

Figure 3:
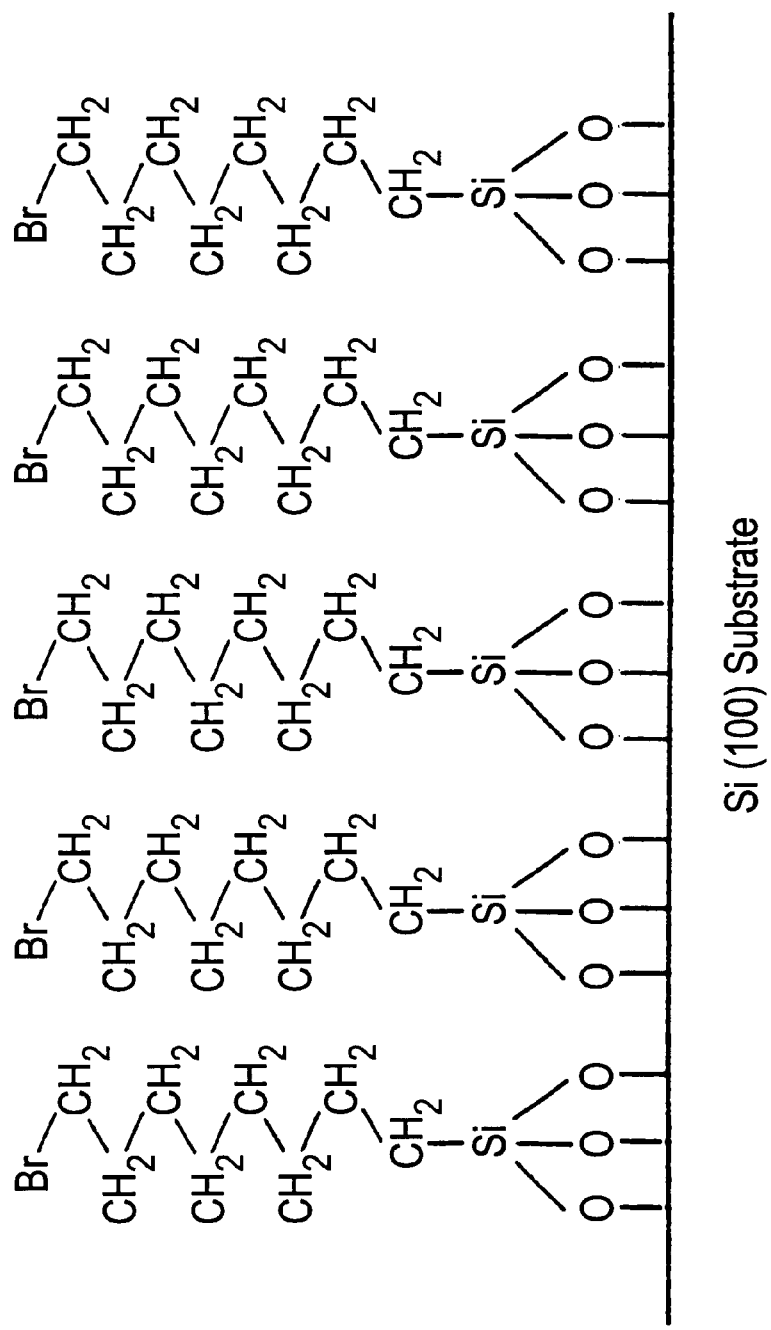
FIG. 3 is a schematic drawing showing a bonding condition at molecular level of an Si (100) single crystal substrate with a thin film in the composite material of Example 1.

FIG. 3 shows a schematic drawing showing the bonding condition at molecular level between the Si (100) single crystal substrate and the thin film in the composite material of Example 1.

The resultant substrate was exposed to an ammonia vapor which is a compound B for about 1 week. Then, the substrate was immersed in 1% by weight aqueous solution of NaOH. The substrate was taken out, washed with pure water, and naturally dried under a nitrogen atmosphere for 30 minutes. Thus, a composite material was obtained in which the thin film is formed on the substrate.

Figure 4:
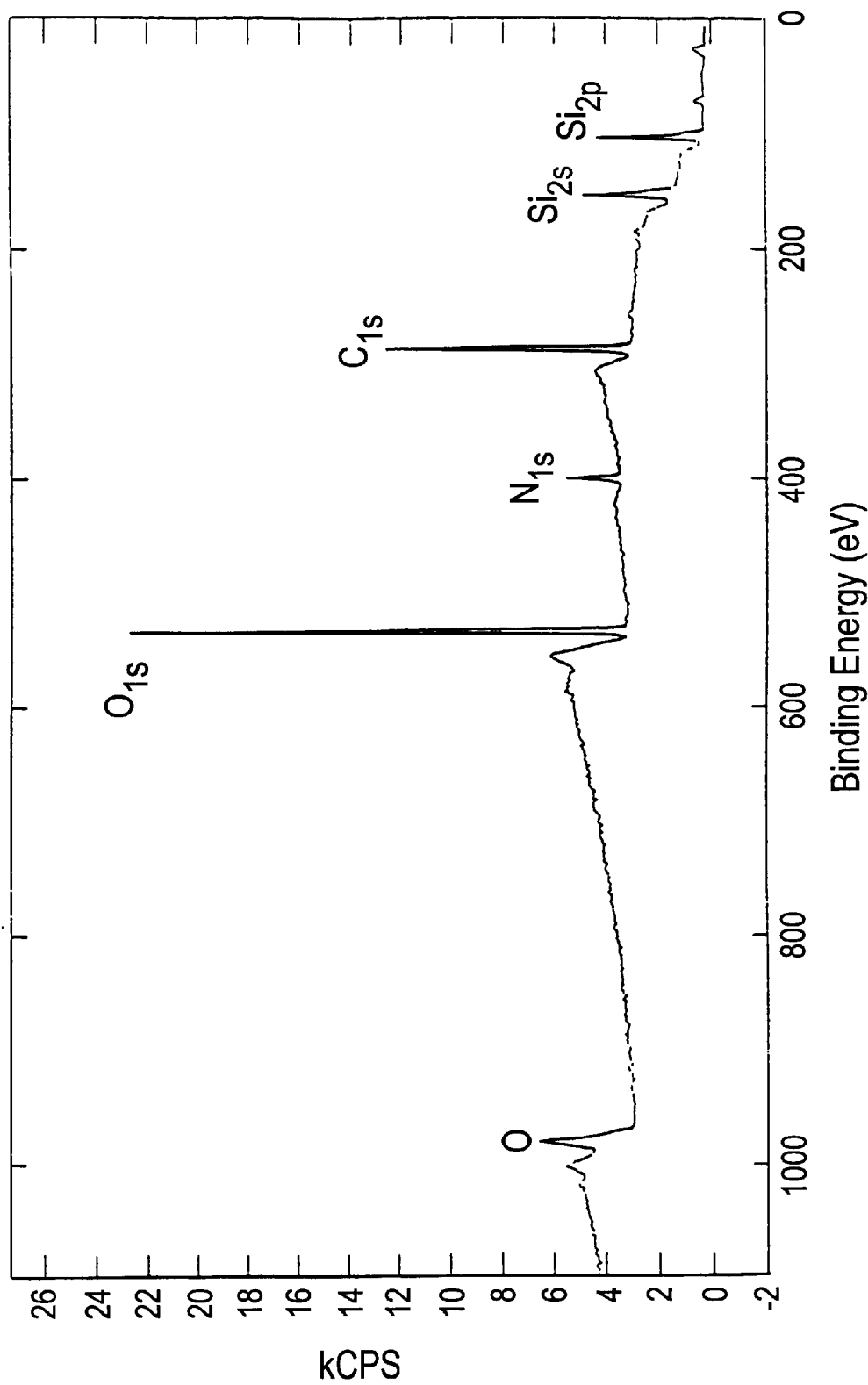
FIG. 4 is a drawing showing a data of an X-ray photoelectron spectrum the composite material, to which amino groups are fixed, of Example 1.

An XPS measurement was conducted regarding the thin film formed on the substrate to observe that signals of 3d, 3p and 3s from a Br atom disappeared and there was a 1s signal of an N atom around 400 eV, as shown in the spectrum data of FIG. 4. From the above-described data, it was confirmed that an amino group was fixed to the substrate.

Figure 5:
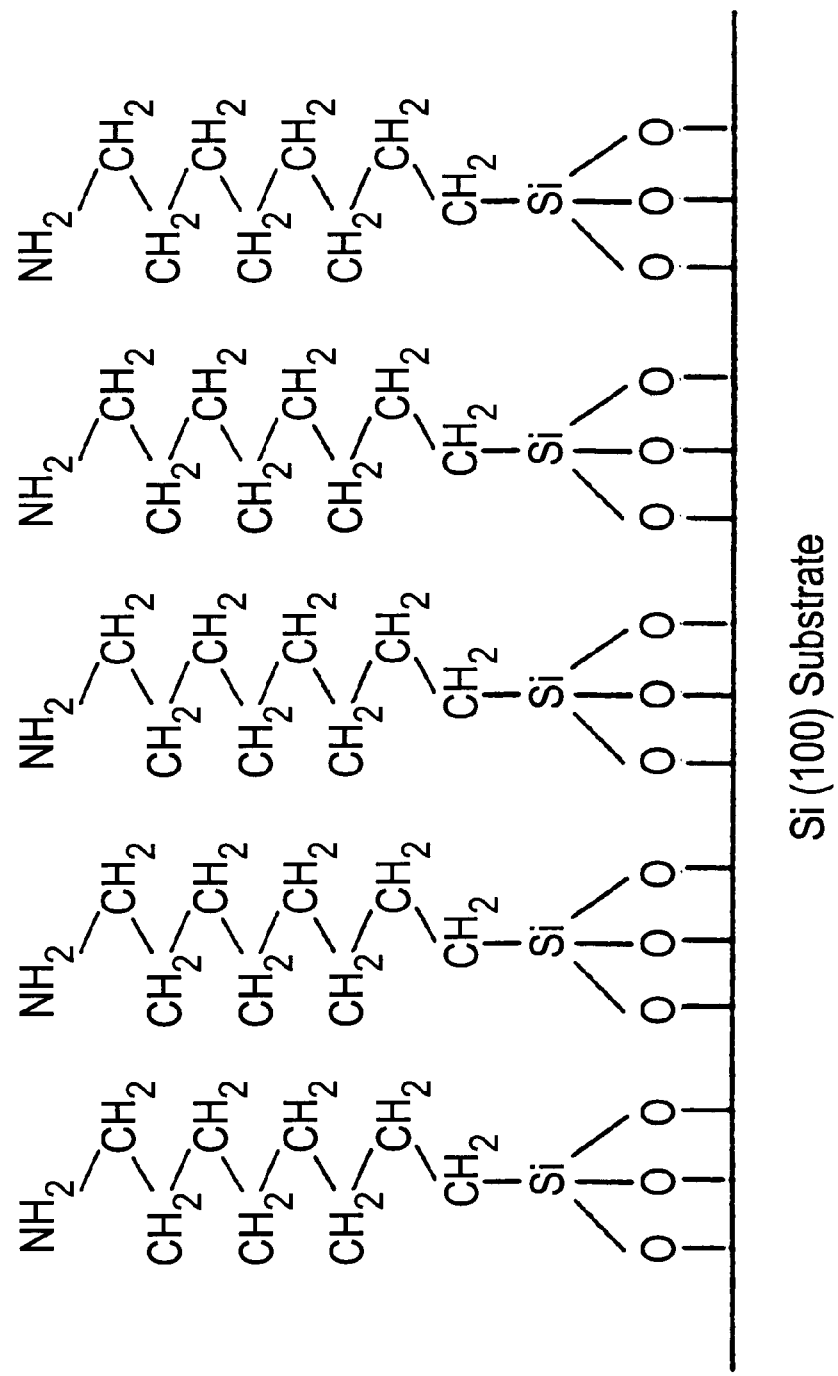
FIG. 5 is a schematic drawing showing a bonding condition at molecular level of an Si (100) single crystal substrate with a thin film to which amino groups are fixed in the composite material of Example 1.

FIG. 5 is a schematic drawing showing the bonding condition atmolecular level between the Si (100) single crystal substrate and the thin film on which an amino group is fixed in the composite material of Example 1.

This composite material was heated at a temperature of 150° C. for 12 hours. It was found that separation of the thin film from the composite material did not occur, and the composite material had an excellent heat resistance.

Example 2

A composite material was prepared in the same manner as in Example 1 except that the following changes were made in Example 1.

In the solution A of Example 1, the above-described mixed solvent was changed to toluene, and the compound A was changed to 8-bromooctyltrimethoxysilane [8-Br(CH$_2$)$_8$Si(OCH$_2$CH$_3$)$_3$]. The substrate after immersion in the solution A was washed using toluene and acetone instead of n-hexadecane and acetone. An FT-IR measurement and an XPS measurement were conducted in the same manner as in Example 1, to confirm that 8-bromooctyltrimethoxysilane bonded to the Si (100) single crystal substrate.

This substrate was immersed in aniline which is a compound B, and was allowed to react at a temperature of 100° C. for 5 hours under dry nitrogen atmosphere. Then, the substrate was washed with ethyl alcohol and acetone, and naturally dried for 30 minutes under nitrogen atmosphere.

Figure 6:
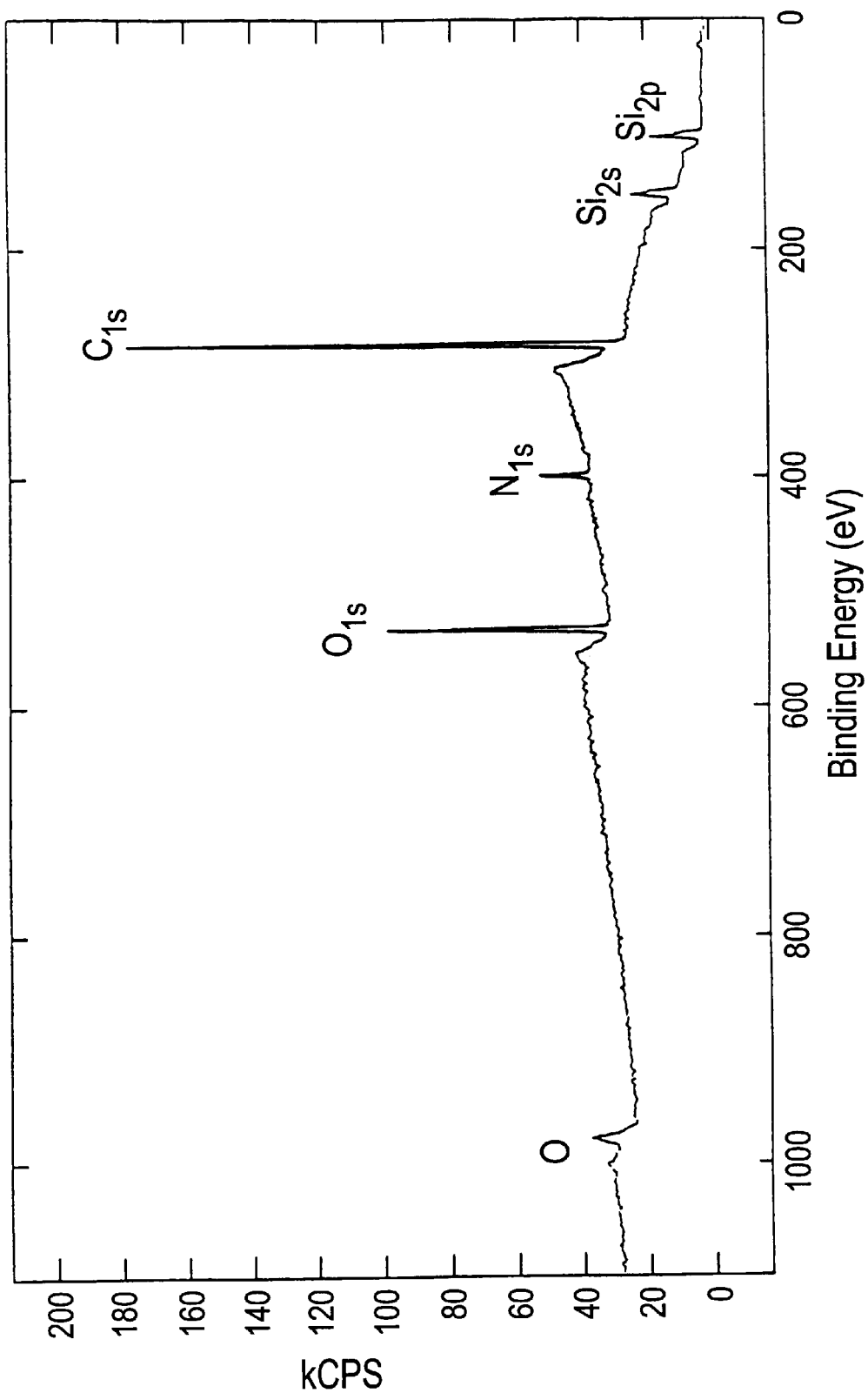
FIG. 6 is a drawing showing a data of an X-ray photoelectron spectrum regarding a thin film in the composite material of Example 2.
Figure 7:
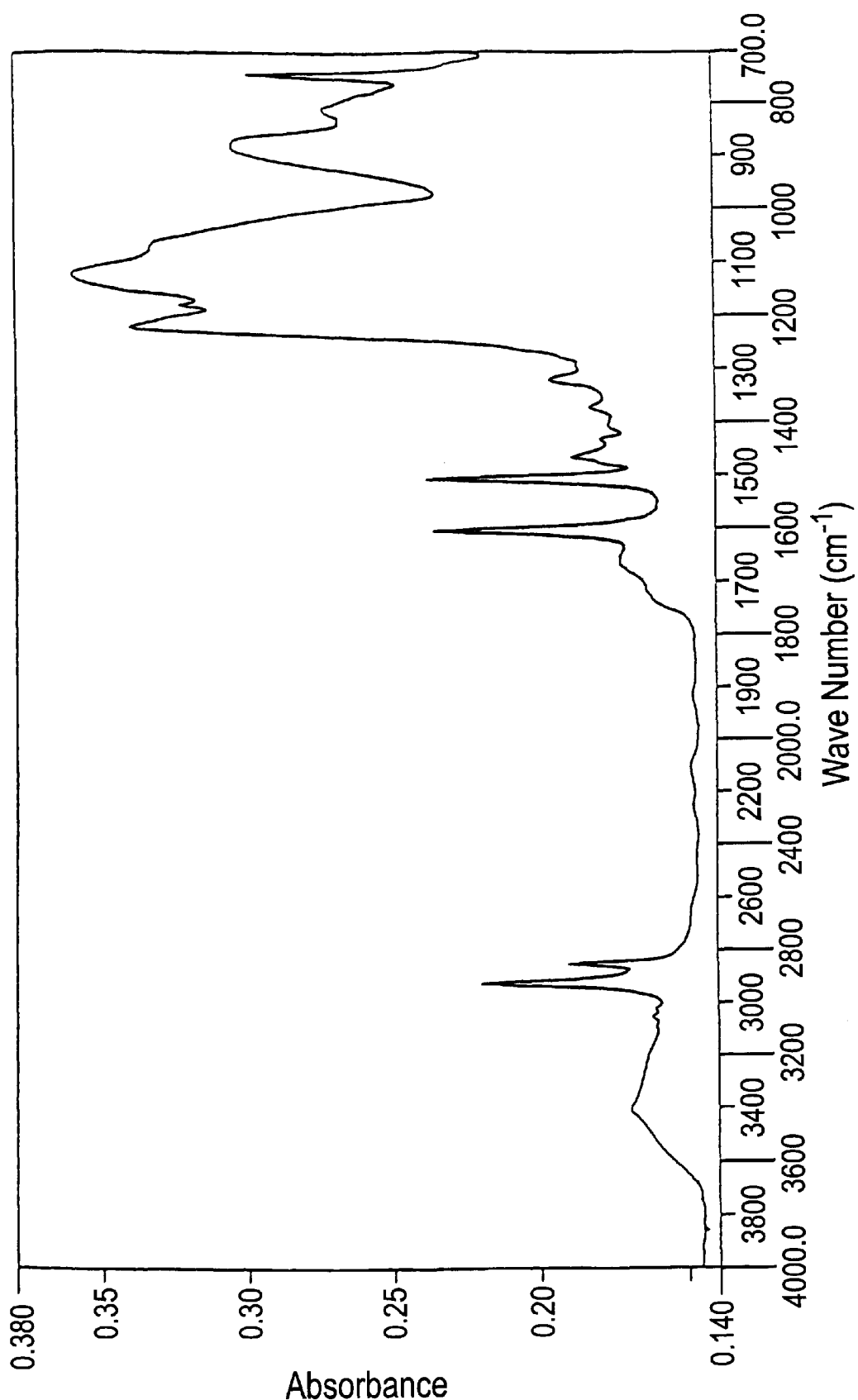
FIG. 7 is a drawing showing a data of a Fourier transform infrared absorption spectrum regarding a thin film in the composite material of Example 2.

An XPS measurement was conducted regarding the thin film formed on the substrate to observe that signals of 3d, 3p and 3s from a Br atom disappeared and there was a is signal of a N atom around 400 eV, as shown in the spectrum data of FIG. 6. Further, an FT-IR measurement was conducted to observe C—C stretch vibrations of a benzene ring around 1500 cm$^{-1}$ and 1600 cm$^{-1}$. The FT-IR spectrum data is shown in FIG. 7. From the result of the FT-IR measurement, when this sample was heated at 200° C., C—C stretch vibrations of a benzene ring around 1500 cm$^{-1}$ and 1600 cm$^{-1}$ were observed. From the result of the XPS measurement, a is signal of a N atom was observed around 400 eV. From the above-described data, it was confirmed that an aniline molecule firmly bonded and was fixed to the substrate.

Figure 8:
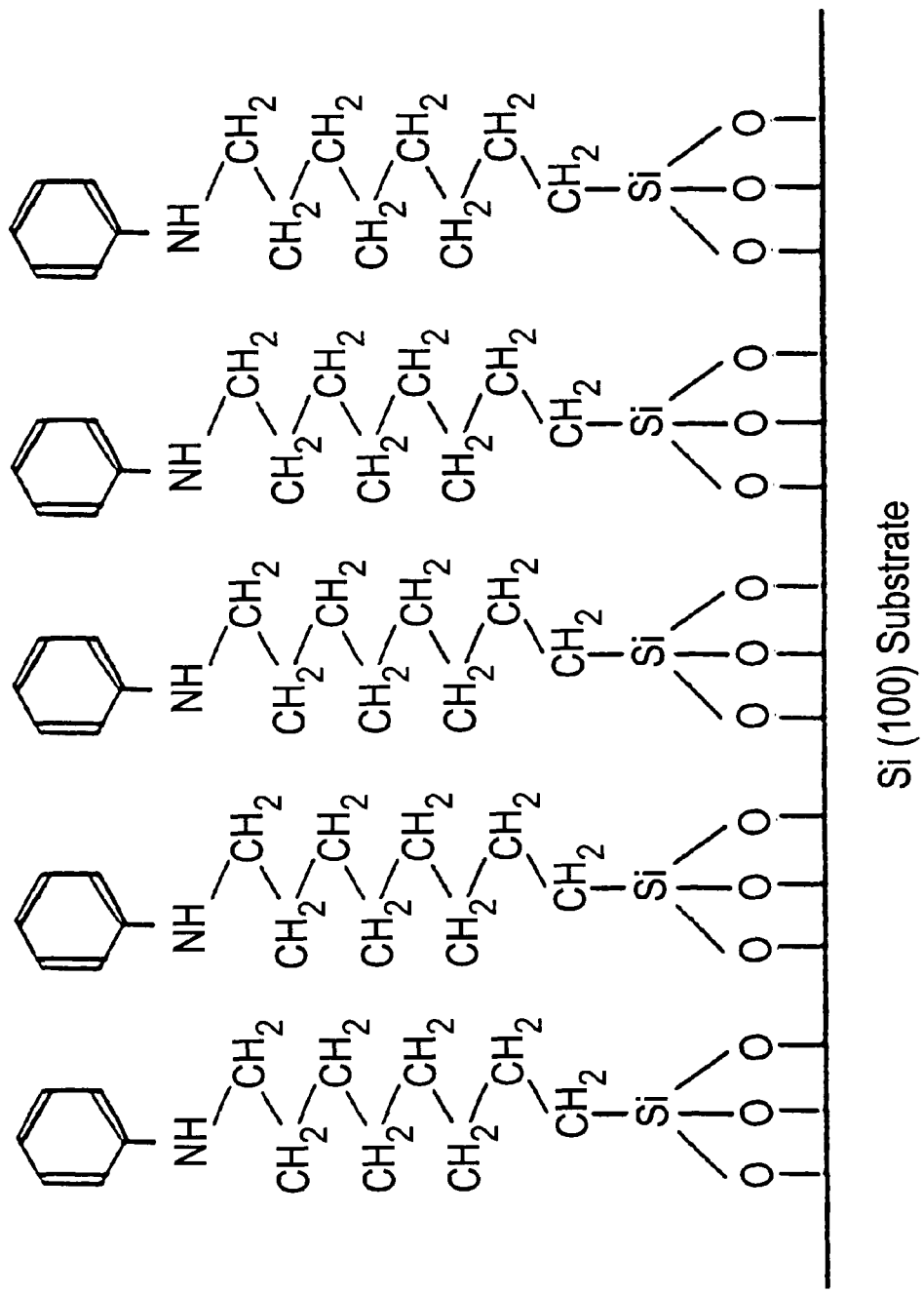
FIG. 8 is a schematic drawing showing a bonding condition at molecular level of an Si (100) single crystal substrate with a thin film to which aniline molecules are fixed in the composite material of Example 2.

FIG. 8 is a schematic drawing showing the bonding condition at molecular level between the Si (100) single crystal substrate and the thin film to which aniline molecules are fixed in the composite material of Example 2.

This composite material was heated at a temperature of 150° C. for 12 hours. It was found that separation of the thin film from the composite material did not occur, and the composite material had an excellent heat resistance.

Example 3

A composite material was prepared in the same manner as in Example 2 except that the following changes were made in Example 2.

In the solution A of Example 2, the compound A was changed to 3-chloropropylmethyldimethoxysilane [3-Cl $(CH_2)_3Si(CH_3)(OCH_3)_2$].

An FT-IR measurement and an XPS measurement were conducted in the same manner as in Example 2.

In the FT-IR measurement, signals due to symmetric stretch vibration and anti-symmetric stretch vibration of a —$CH_2$— group were observed around 2840 to 2930 $cm^{-1}$, a signal due to stretch vibration of an Si—C group was observed around 1240 $cm^{-1}$, and a signal due to skeltal vibration of an Si—O—Si group was observed around 1080 $cm^{-1}$.

In the XPS measurement, a signal of 2s around 270 eV and a signal of 2p around 200 eV from a Cl atom were observed. From the above-described data, it was confirmed that 3-chloropropylmethyldimethoxysilane bonded to the surface of the Si (100) single crystal substrate.

Then, this substrate was immersed in aniline in the same manner as in Example 2, and the FT-IR measurement and an XPS measurement were conducted.

In the FT-IR measurement, C—C stretch signals of a benzene ring were observed around 1500 $cm^{-1}$ and 1600 $cm^{-1}$. In the XPS measurement, a is signal of a N atom around 400 eV was observed. From the above-described data, it was confirmed that an aniline molecule was fixed to the substrate.

This composite material was heated at a temperature of 150° C. for 12 hours. It was found that separation of that the thin film from the composite material did not occur, and the composite material had an excellent heat resistance.

Example 4

A composite material was prepared in the same manner as in Example 2 except that the following changes were made in Example 2.

In the solution A of Example 2, toluene was changed to n-hexadecane and the compound A was changed to 8-bromooctylthiol [8-Br$(CH_2)_8$SH]. The substrate was change to a Au (111) single crystal substrate. After immersion in the solution A, the substrate was washed with n-hexadecane and acetone instead of toluene and acetone. The substrate was naturally dried for 30 minutes under nitrogen atmosphere, then no heating was conducted.

An FT-IR measurement and an XPS measurement were conducted in the same manner as in Example 2. In the FT-IR measurement, signals due to symmetric stretch vibration and anti-symmetric stretch vibration of a —$CH_2$— group were observed around 2840 to 2930 $cm^{-1}$. In the XPS measurement, a signal of 3d around 70 eV, a signal of 3p around 180 eV and a signal of 3s around 256 eV from a Br atom were observed.

Then, this substrate was immersed in aniline in the same manner as in Example 2, and an FT-IR measurement and an XPS measurement were conducted.

In the FT-IR measurement, C—C stretch signals of a benzene ring were observed around 1500 $cm^{-1}$ and 1600 $cm^{-1}$. In the XPS measurement, a is signal of a N atom around 400 eV was observed. From the above-described data, it was confirmed that an aniline molecule was fixed to the substrate.

This composite material was heated for 12 hours at a temperature of 100° C. It was found that separation of the thin film from the composite material, and the composite material had an excellent heat resistance.

Example 5

A composite material was prepared in the same manner as in Example 2 except that the following changes were made in Example 2.

In the solution A of Example 2, the compound A was changed to 3-iodopropyltrimethoxysilane [3-I$(CH_2)_3$Si $(OCH_3)_3$]. The substrate was immersed in the solution A for 6 hours.

An FT-IR measurement and an XPS measurement were conducted in the same manner as in Example 2. In the FT-IR measurement, signals due to symmetric stretch vibration and anti-symmetric stretch vibration of a —$CH_2$— group were observed around 2840 to 2930 $cm^{-1}$, a signal due to stretch vibration of a Si—C group was observed around 1240 $cm^{-1}$, and a signal due to skeltal vibration of a Si—O—Si group was observed around 1080 $cm^{-1}$. In the XPS measurement, a signal of 3p1/2 around 930 eV, a signal of 3p3/2 around 874 eV, a signal of 3d3/2 around 630 eV, a signal of 3d5/2 around 620 eV and a signal of 4d around 50 eV from an I atom were observed.

Then, this substrate was immersed in aniline in the same manner as in Example 2, and an FT-IR measurement and an XPS measurement were conducted.

In the FT-IR measurement, C—C stretch signals of a benzene ring were observed around 1500 $cm^{-1}$ and 1600 $cm^{-1}$. In the XPS measurement, a 1s signal of an N atom around 400 eV was observed. From the above-described data, it was confirmed that a aniline molecule was fixed to the substrate.

This composite material was heated at a temperature of 150° C. for 12 hours. It was found that separation of the thin film from the composite material, and the composite material had an excellent heat resistance.

Example 6

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 8-bromooctyldimethylchlorosilane [8-Br $(CH_2)_8Si(CH_3)_2Cl$]. The substrate was immersed in the solution A for 1 hour. After immersion in the solution A, the substrate was washed with n-hexadecane and acetone instead of toluene and acetone.

An FT-IR measurement and an XPS measurement were conducted in the same manner as in Example 2. It was confirmed that 8-bromooctyldimethylchlorosilane bonded to the Si (100) single crystal substrate.

In Example 2, the compound B was changed to ethylenediamine, and the substrate was immersed in ethylenediamine, and allowed to react at a temperature of 100° C. for 3 hours under dry nitrogen atmosphere. An FT-IR measurement and an XPS measurement were conducted in the same manner as in Example 2.

Figure 9:
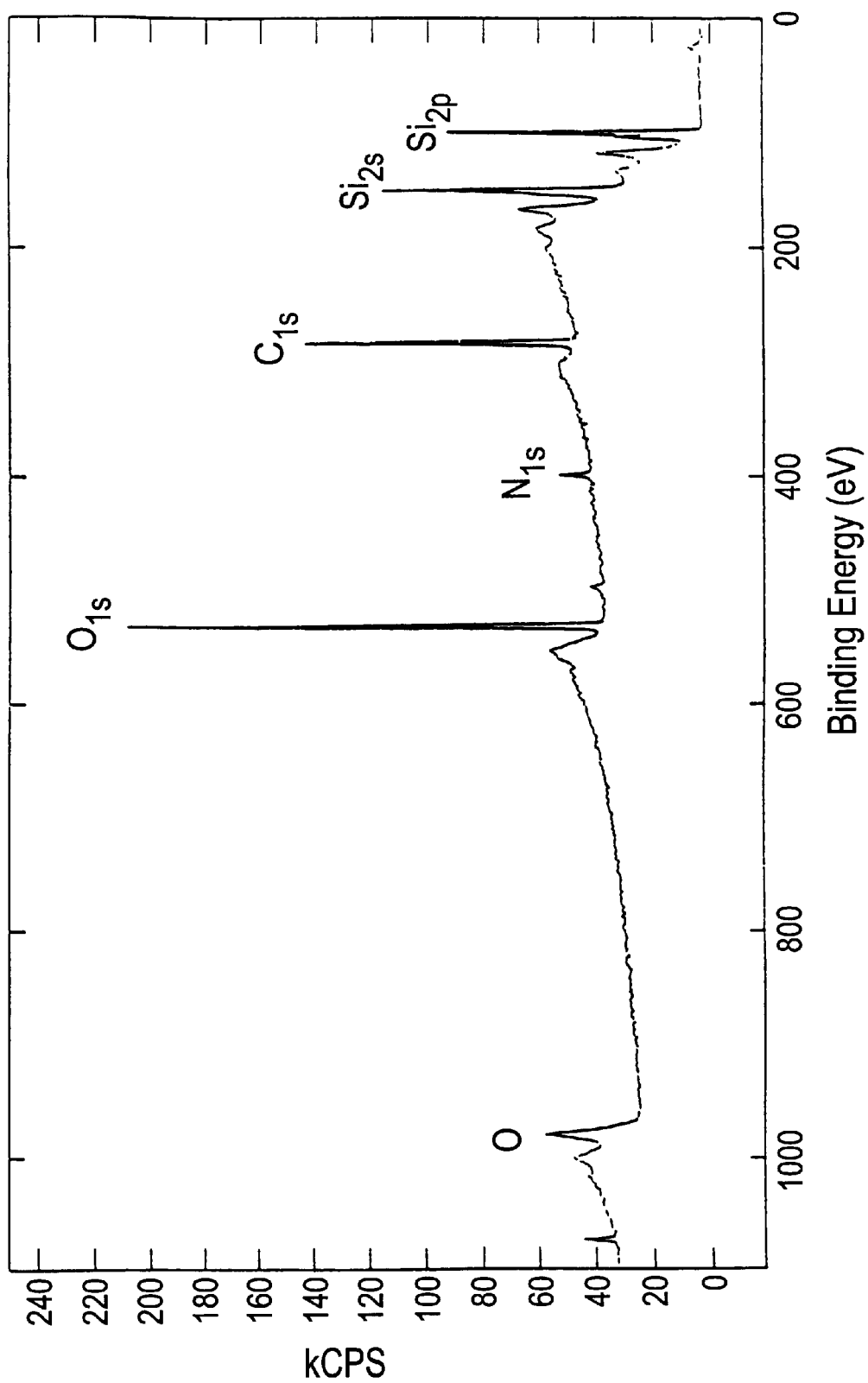
FIG. 9 is a drawing showing a data of an X-ray photoelectron spectrum regarding a thin film in the composite material of Example 6.

In the XPS measurement, 3d, 3p and 3s signals from a Br atom disappeared and there was a is signal of a N atom around 400 eV, as shown in the spectrum data of FIG. 9.

In the FT-IR measurement, it was observed that signals due to symmetric stretch vibration and anti-symmetric stretch vibration of a —$CH_2$— group increased around 2840 to 2930 $cm^{-1}$ From the above-described data, it was confirmed that ethylenediamine was fixed to the substrate.

Figure 10:
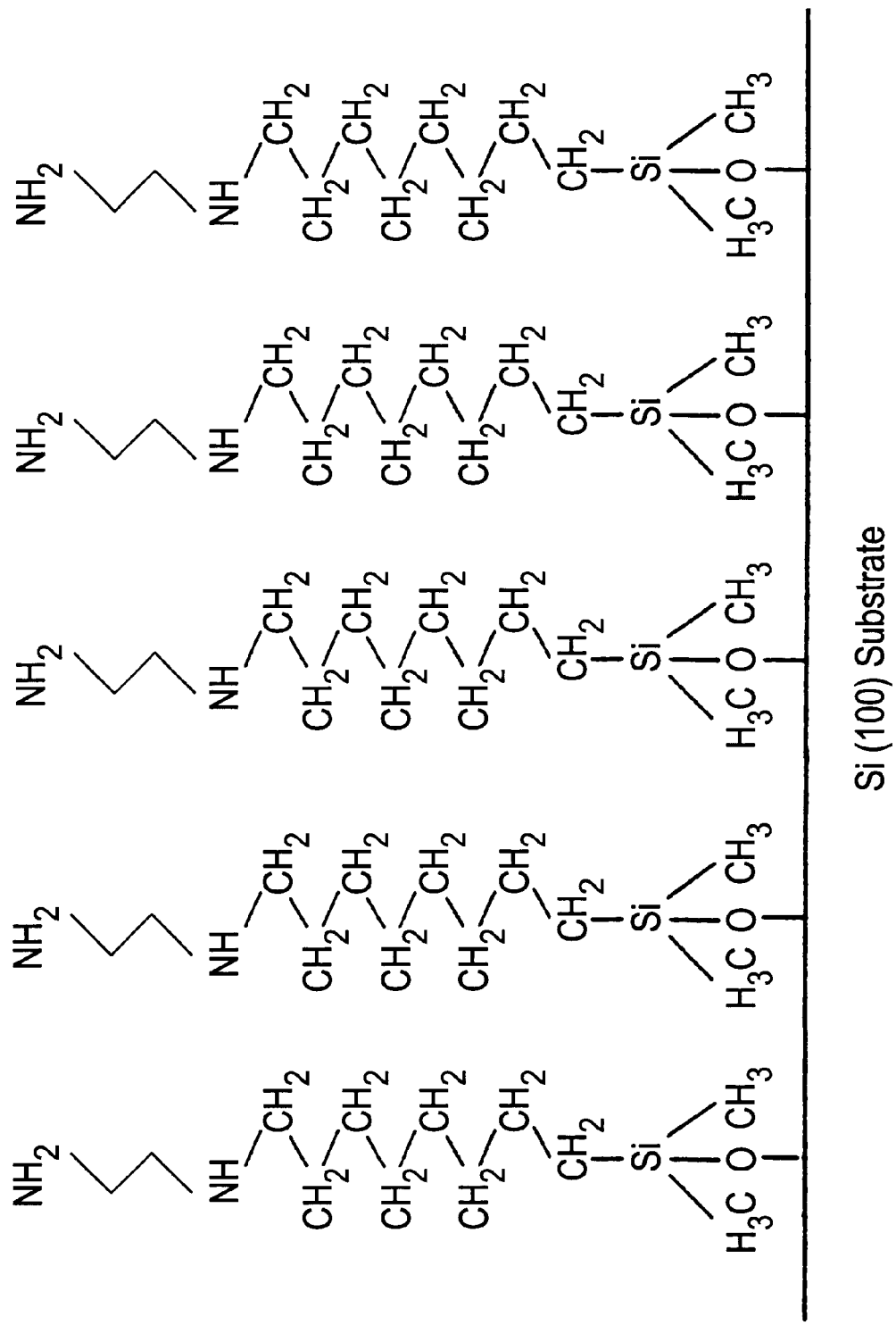
FIG. 10 is a schematic drawing showing a bonding condition at molecular level of an Si (100) single crystal substrate with a thin film to which ethylenediamine molecules are fixed in the composite material of Example 6.

FIG. 10 shows a schematic drawing showing the bonding condition at molecular level between the Si (100) single crystal substrate and the thin film to which an ethylenediamine molecule is fixed in the composite material of Example 6.

This composite material was heated at a temperature of 150° C. for 12 hours. It was found that separation of the thin film from the composite material did not occur, and the composite material had an excellent heat resistance.

Example 7

A composite material was prepared in the same manner as in Example 2 except that the following changes were made in Example 6.

In the solution A of Example 6, the compound A was changed to 4-bromobutyldimethylchlorosilane [4-Br($CH_2$)$_4$Si($CH_3$)$_2$Cl].

An FT-IR measurement and an XPS measurement were conducted in the same manner as in Example 6. It was confirmed that 4-bromobutyldimethylchlorosilane bonded to the Si (100) single crystal substrate.

In Example 6, the compound B was changed to pyrrole, and the substrate was immersed in pyrrole, and allowed to react at a temperature of 90° C. for 8 hours under dry nitrogen atmosphere. An FT-IR measurement and an XPS measurement were conducted in the same manner as in Example 6.

In the XPS measurement, a is signal of a N atom around 400 eV was observed. From the above-described data, it was confirmed that pyrrole was fixed to the substrate.

Figure 11:
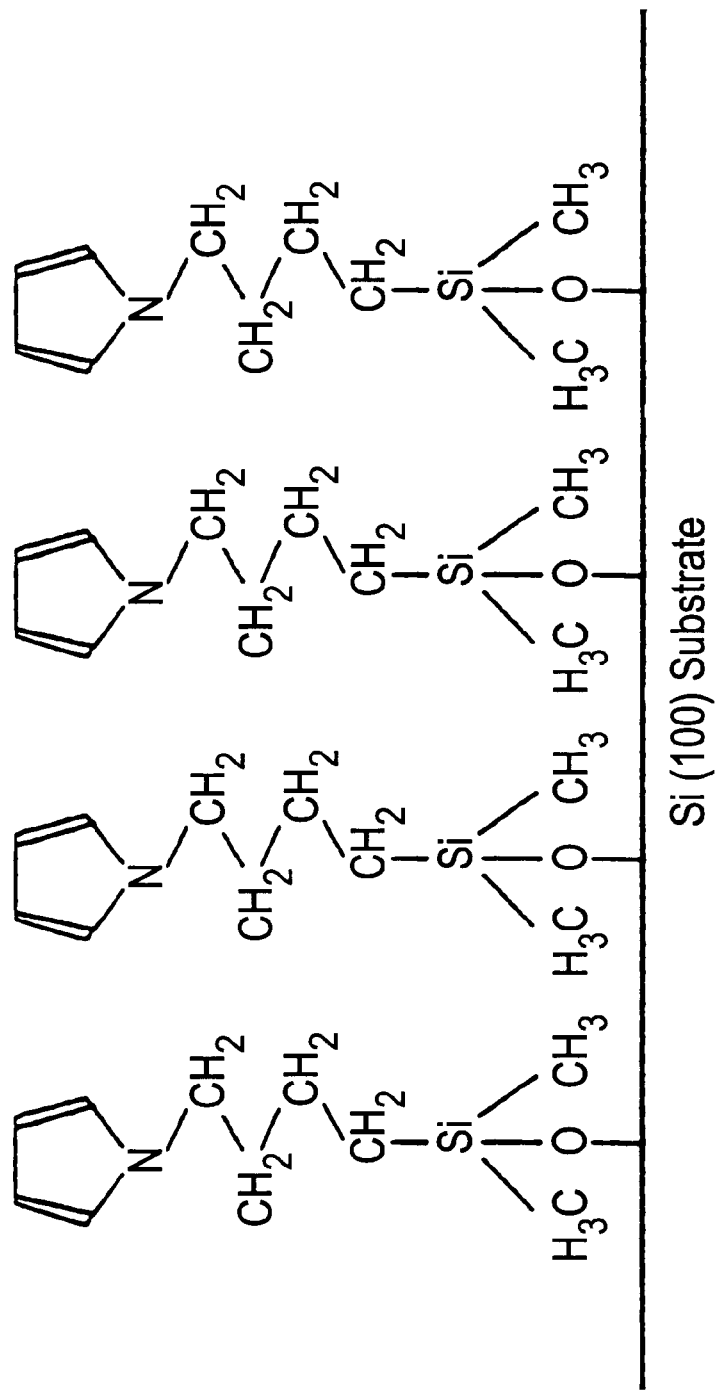
FIG. 11 is a schematic drawing showing a bonding condition at molecular level of an Si (100) single crystal substrate with a then film to which pyrrole molecules are fixed in the composite material of Example 7.

FIG. 11 shows a schematic drawing showing the bonding condition at molecular level between the Si (100) single crystal substrate and the thin film to which a pyrrole molecule is fixed in the composite material of Example 7.

This composite material was heated at a temperature of 150° C. for 12 hours. It was found that separation of the thin film from the composite material did not occur, and the composite material had an excellent heat resistance.

Example 8

A composite material was prepared in the same manner as in Example 2 except that the following changes were made in Example 7.

In the solution A of Example 7, the compound A was changed to 3-bromopropyltrichlorogermane [3-Br($CH_2$)$_3$GeCl$_3$].

An FT-IR measurement and an XPS measurement were conducted in the same manner as in Example 7. It was confirmed that 3-bromopropyltrichlorogermane bonded to the Si (100) single crystal substrate.

Then, this substrate was immersed in pyrrole in the same manner as in Example 7, and an FT-IR measurement and an XPS measurement were conducted.

In the XPS measurement, a is signal of a N atom around 400 eV was observed. From the above-described data, it was confirmed that pyrrole was fixed to the substrate.

This composite material was heated at a temperature of 150° C. for 12 hours. It was found that separation of the thin film from the composite material did not occur, and the composite material had an excellent heat resistance.

Example 9

A composite material was prepared in the same manner as in Example 2 except that the following changes were made in Example 7.

In the solution A of Example 7, the compound A was changed to 8-bromooctyldimethylchlorosilane [8-Br($CH_2$)$_8$Si($CH_3$)$_2$Cl]. The substrate was immersed in the solution A for 2 hours.

An FT-IR measurement and an XPS measurement were conducted in the same manner as in Example 7. It was confirmed that 8-bromooctyldimethylchlorosilane bonded to the Si (100) single crystal substrate.

In Example 7, the compound B was changed to N-methylaniline, and the substrate was immersed in N-methylaniline, and allowed to react at a temperature of 100° C. for 5 hours under dry nitrogen atmosphere. An FT-IR measurement and an XPS measurement were conducted. In the FT-IR measurement, C—C stretch signals of a benzene ring were observed around 1500 $cm^{-1}$ and 1600 $cm^{-1}$. In the XPS measurement, a 1s signal of a N atom around 400 eV was observed. From the above-described data, it was confirmed that N-methylaniline was fixed to the substrate.

This composite material was heated at a temperature of 150° C. for 12 hours. It was found that separation of the thin film from the composite material did not occur, and the composite material had an excellent heat resistance.

Example 10

A composite material was prepared in the same manner as in Example 2 except that the following changes were made in Example 2.

In the solution A of Example 2, the compound A was changed to 3-chloropropyltrimethoxysilane [3-Cl($CH_2$)$_3$Si(O$CH_2CH_3$)$_3$]. The substrate was changed to one obtained by heating silica (manufactured by Nippon Aerosil K.K., AEROSIL 130, specific surface area 130 $m^2$/g) at 100° C. for 8 hours. 25 g of this silica was charged into a round bottom flask together with the solution A, and the mixture was refluxed at 60° C. for 10 hours under dry nitrogen atmosphere. Then the mixture was filtered through a filter to separate only silica. This silica was stirred with toluene for 3 hours before filtration and further stirred with ethanol for 3 hours before filtration. The resulting silica was heated at 80° C. in vacuo (about $10^{-2}$ Torr) to be dried.

An FT-IR measurement and an XPS measurement were conducted in the same manner as in Example 2. It was confirmed that 3-chloropropylethoxysilane bonded to the silica.

Then, this silica was immersed in aniline in the same manner as in Example 2, then, allowed to react at temperature of 100° C. for 8 hours under dry nitrogen atmosphere. The resulting mixture was filtered through a filter to separate only silica, and the obtained silica was mixed in ethyl alcohol and the mixture was stirred for 1 hour, and then filtered. This process was repeated twice. The filtered silica was naturally dried for 1 day under nitrogen atmosphere. An FT-IR measurement and an XPS measurement were conducted in the same manner as in Example 2. In the FT-IR measurement, C—C stretch signals of a benzene ring were observed around 1500 $cm^{-1}$ and 1600 $cm^{-1}$. In the XPS measurement, a is signal of a N atom around 400 eV was observed. From the above-described data, it was confirmed that aniline was fixed to the silica.

This composite material was heated at a temperature of 150° C. for 12 hours. It was found that separation of the thin film from the composite material did not occur, and the composite material had an excellent heat resistance.

Example 11

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 8-bromooctyldimethylchlorosilane [8-Br $(CH_2)_8Si(CH_3)_2Cl$]. The substrate was immersed in the solution A for 1 hour. The substrate after immersion in the solution A was washed with n-hexadecane and acetone instead of toluene and acetone.

An FT-IR measurement and an XPS measurement were conducted in the same manner as in Example 2. It was confirmed that 8-bromooctyldimethylchlorosilane bonded to the Si (100) single crystal substrate.

In Example 2, the compound B was changed to ethylenediamine, and the substrate was brought into contact with vaporized ethylenediamine under vacuum ($2 \times 10^{-5}$ Torr) to allow to react. An FT-IR measurement and an XPS measurement were conducted in the same manner as in Example 2. In the XPS measurement, it was observed that 3d, 3p and 3s signals from a Br atom disappeared and there was a 1s signal of a N atom around 400 eV. In the FT-IR measurement, it was observed that signals due to symmetric stretch vibration and anti-symmetric stretch vibration of a —$CH_2$— group increased around 2840 to 2930 $cm^{-1}$ From the above-described data, it was confirmed that ethylenediamine was fixed to the substrate.

This composite material was heated at a temperature of 150° C. for 12 hours. It was found that separation of the thin film from the composite material did not occur, and the composite material had an excellent heat resistance.

Example 12

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 3-bromopropyltrichlorosilane [3-Br $(CH_2)_3 SiCl_3$]. The substrate was immersed in the solution A for 1 hour. The substrate after immersion in the solution A was washed with n-hexadecane and acetone instead of toluene and acetone.

An FT-IR measurement and an XPS measurement were conducted in the same manner as in Example 2. It was confirmed that 3-bromopropyltrichlorosilane bonded to the Si (100) single crystal substrate.

In Example 2, the compound B was changed to p-phenylenediamine, and the substrate was immersed in a solution prepared by dissolving p-phenylenediamine in ethanol, and allowed to react at a temperature of 100° C. for 5 hours under dry nitrogen atmosphere. An FT-IR measurement and an XPS measurement were conducted in the same manner as in Example 2. In the FT-IR measurement, C—C stretch signals of a benzene ring were observed around 1500 $cm^{-1}$ and 1600 $cm^{-1}$. In the XPS measurement, it was observed that 3d, 3p and 3s signals from a Br atom disappeared and there was a 1s signal of a N atom around 400 eV. From the above-described data, it was confirmed that p-phenylenediamine was fixed to the substrate.

Figure 12:
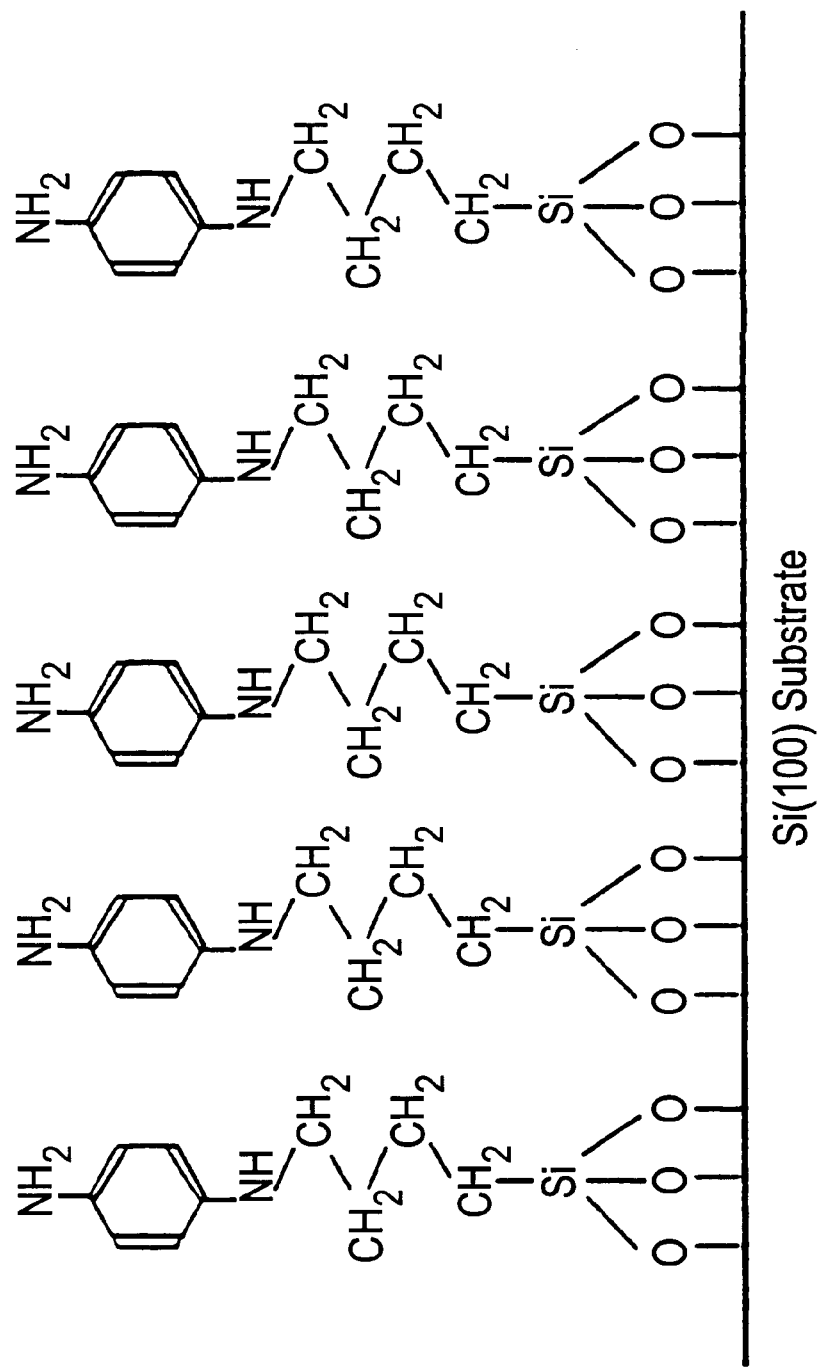
FIG. 12 is a schematic drawing showing a bonding condition at molecular level of an Si (100) single crystal substrate with a thin film to which p-phenylenediamine molecules are fixed in the composite material of Example 12.
Figure 13:
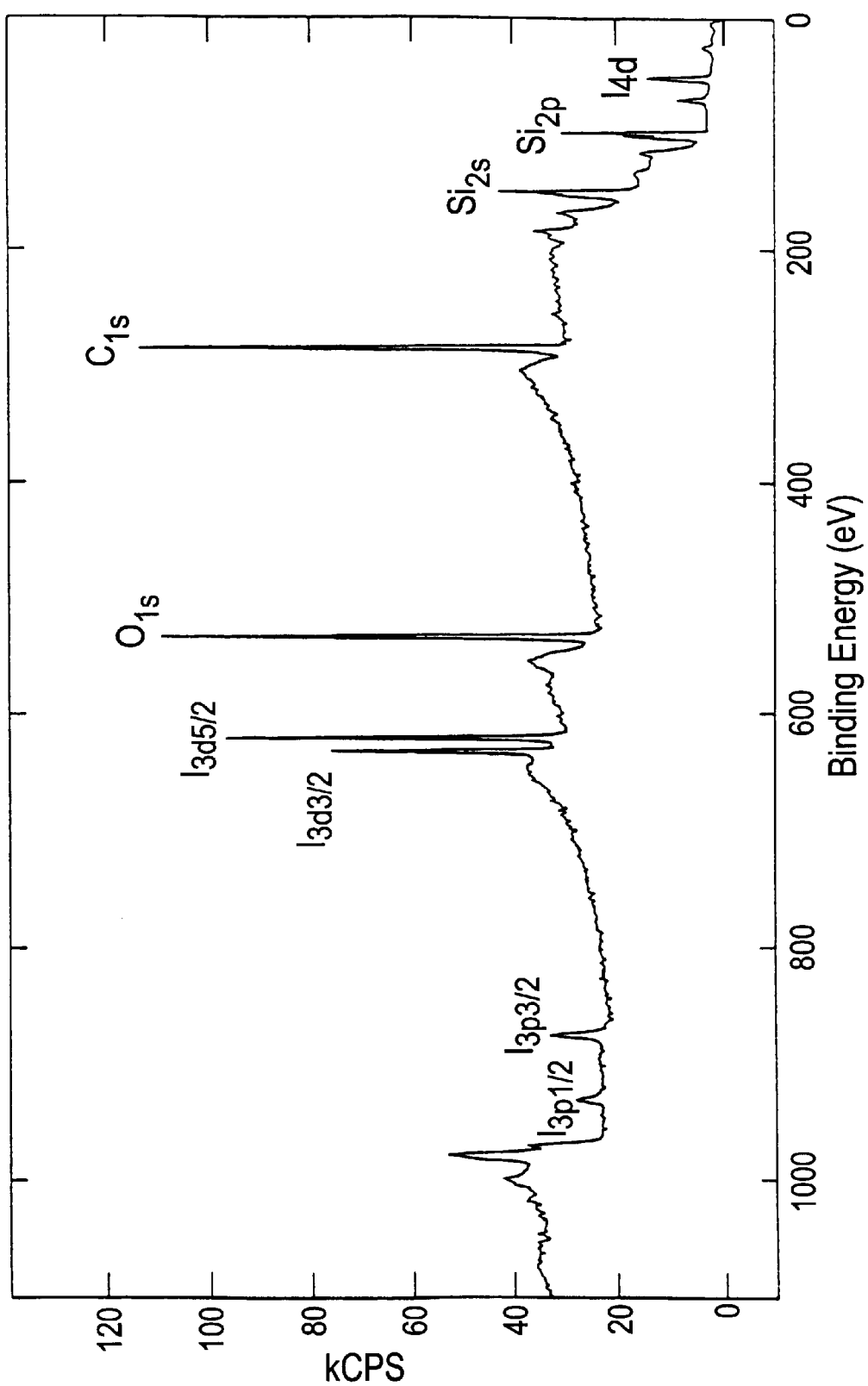
FIG. 13 is a drawing showing a data of an X-ray photoelectron spectrum regarding a thin film in the composite material of Example 13.

FIG. 12 shows a schematic drawing showing the bonding condition at molecular level between the Si (100) single crystal substrate and the thin film to which a p-phenylenediamine molecule is fixed in the composite material of Example 12.

This composite material was heated at a temperature of 150° C. for 12 hours. It was found that separation of the thin film from the composite material did not occur, and the composite material had an excellent heat resistance.

Example 13

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 11-bromomethyltrichlorosilane [11-Br $(CH_2)_{11}SiCl_3$]. The substrate was immersed in the solution A for 1 hour. The substrate after immersion in the solution A was washed with n-hexadecane and acetone instead of toluene and acetone.

An FT-IR measurement and an XPS measurement were conducted in the same manner as in Example 2. It was confirmed that 11-bromomethyltrichlorosilane bonded to the Si (100) single crystal substrate.

In Example 2, the compound B was changed to 2',4',5',7'-tetraiodofluorescein, the substrate was immersed in a dimethylformamide solution containing the compound B at a concentration of $5 \times 10^{-4}$ mol/l, and allowed to react at a temperature of 90° C. for 24 hours under dry nitrogen atmosphere. An FT-IR measurement and an XPS measurement were conducted in the same manner as in Example 2.

In the XPS measurement, 3d, 3p and 3s signals from a Br atom disappeared and a signal of 3p1/2 around 930 eV, a signal of 3p3/2 around 874 eV, a signal of 3d3/2 around 630 eV, a signal of 3d5/2 around 620 eV and a signal of 4d around 50 eV from an I atom of 2',4',5',7'-tetraiodofluorescein were observed.

Figure 14:
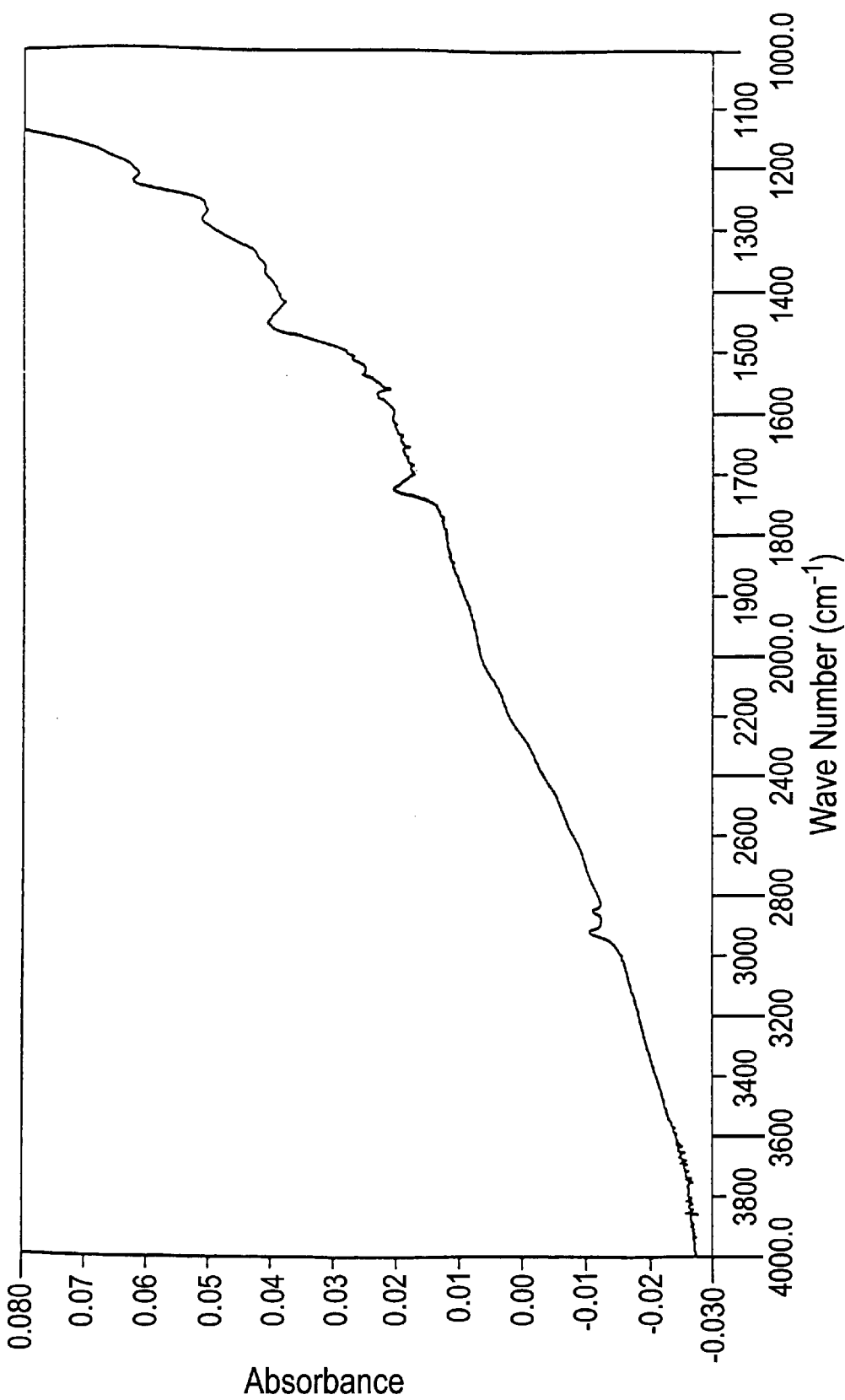
FIG. 14 is a drawing showing a data of a Fourier transform infrared absorption spectrum regarding a thin film in the composite material of Example 13.

In the FT-IR measurement, a signal due to symmetric stretch vibration of a >C=O group of 2',4',5',7'-tetraiodofluorescein was observed around 1720 $cm^{-1}$ as shown in the spectrum data of FIG. 14.

From the above-described data, it was confirmed that 2',4',5',7'-tetraiodofluorescein was fixed to the substrate.

Figure 15:
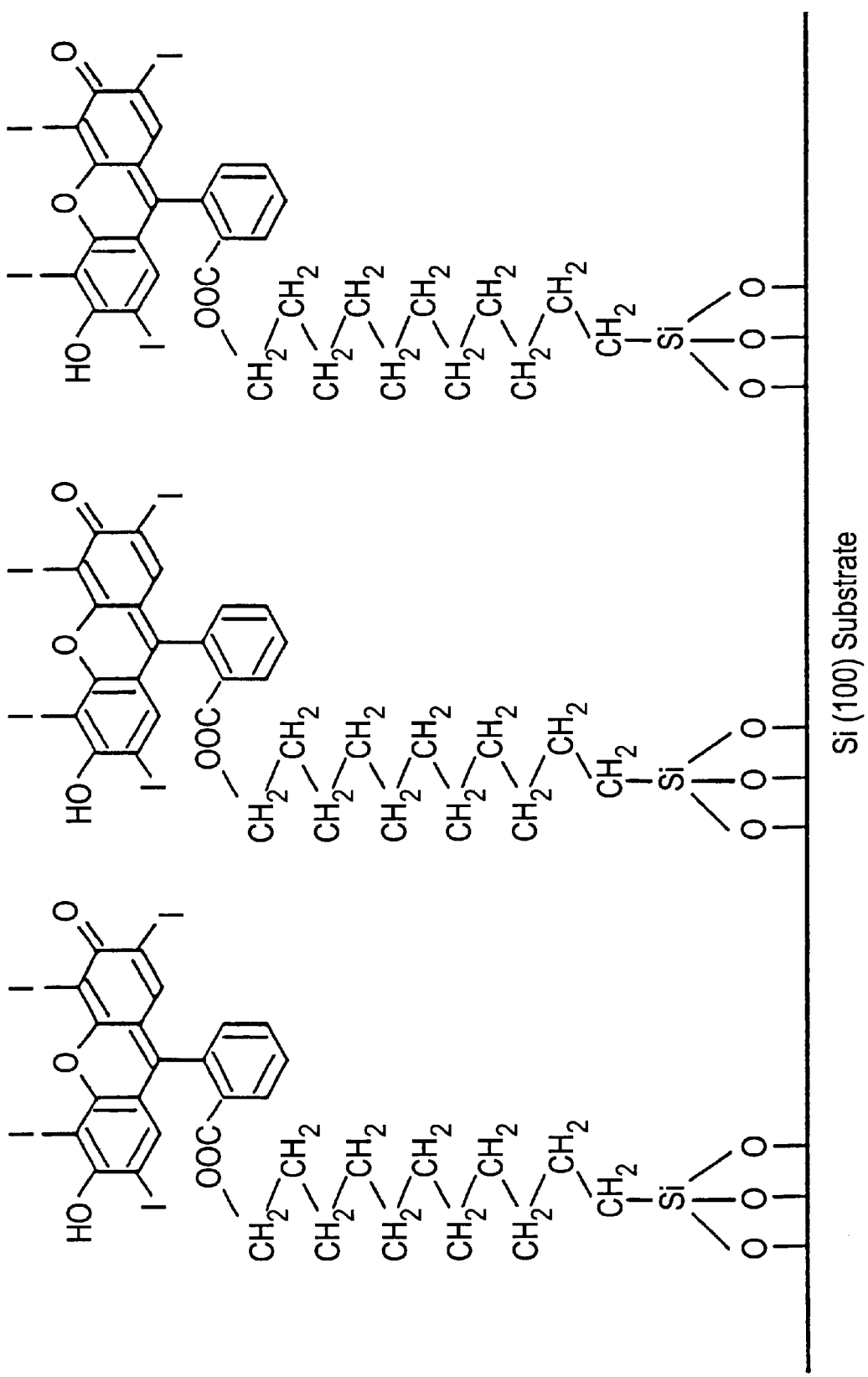
FIG. 15 is a schematic drawing showing a bonding condition at molecular level of an Si (100) single crystal substrate with a thin film to which 2',4',5',7'-tetraiodofluorescein molecules are fixed in the composite material of Example 13.

FIG. 15 shows a schematic drawing showing the bonding condition at molecular level between the Si (100) single crystal substrate and the thin film to which a 2',4',5',7'-tetraiodofluorescein molecule is fixed in the composite material of Example 13.

This composite material was heated at a temperature of 150° C. for 12 hours. It was found that separation of the thin film from the composite material did not occur, and the composite material had an excellent heat resistance.

Example 14

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 11-bromomethyltrichlorosilane [11-Br $(CH_2)_{11}SiCl_3$]. The substrate was immersed in the solution A for 1 hour. The substrate after immersion in the solution A was washed with n-hexadecane and acetone instead of toluene and acetone.

An FT-IR measurement and an XPS measurement were conducted in the same manner as in Example 2. It was confirmed that 11-bromomethyltrichlorosilane bonded to the Si (100) single crystal substrate.

In Example 2, the compound B was changed to benzoic acid, the substrate was immersed in a dimethylformamide solution containing benzoic acid at a concentration of $5 \times 10^{-4}$ mol/l, and allowed to react at a temperature of 90° C. for 24 hours under dry nitrogen atmosphere. An FT-IR measurement and an XPS measurement were conducted in the same manner as in Example 2.

In the XPS measurement, 3d, 3p and 3s signals from a Br atom decreased.

In the FT-IR measurement, a signal due to symmetric stretch vibration of a >C=O group of benzoic acid was observed around 1720 $cm^{-1}$. From the above-described data, it was confirmed that benzoic acid was fixed to the substrate.

This composite material was heated at a temperature of 150° C. for 12 hours. It was found that separation of the thin film from the composite material did not occur, and the composite material had an excellent heat resistance.

Example 15

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 11-bromomethyltrichlorosilane [11-Br$(CH_2)_{11}SiCl_3$]. The substrate was changed to a titanium oxide (001) single crystal ($TiO_2$, manufactured by Chichibu Onoda Cement Corp., rutile type, plate shape, resistance 20 to 50 Ωcm). The substrate was immersed in the solution A for 1 hour. The substrate after immersion in the solution A was washed with n-hexadecane and acetone instead of toluene and acetone.

Figure 16:
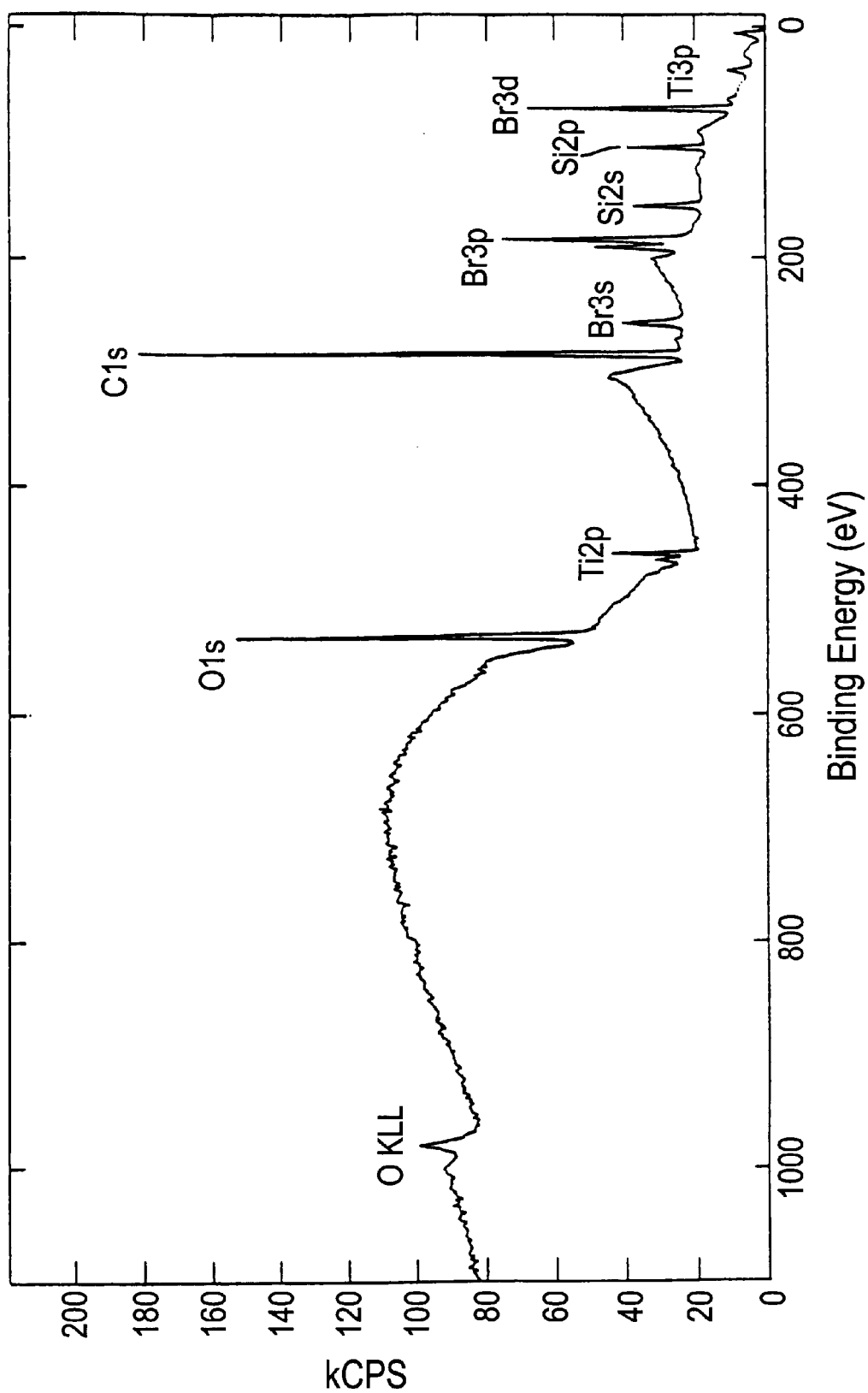
FIG. 16 is a drawing showing a data of an X-ray photoelectron spectrum regarding a thin film in the composite material of Example 15.

An FT-IR measurement and an XPS measurement were conducted in the same manner as in Example 2. In the FT-IR measurement, signals due to symmetric stretch vibration and anti-symmetric stretch vibration of a —$CH_2$— group were observed around 2840 to 2930 $cm^{-1}$ similarly to Example 1. In the XPS measurement, as shown by the spectrum data of FIG. 16, a signal of 3d around 70 eV, a signal of 3p around 180 eV and a signal of 3s around 256 eV from a Br atom, and a signal of 2p around 99 eV and a signal of 2d around 155 eV from a Si atom were respectively observed. A signal from a Cl atom was not simultaneously observed, therefore, it was confirmed that de-hydrochloric acid reaction has occurred.

From the above-described data, it was confirmed that 11-bromomethyltrichlorosilane bonded to the titanium oxide (001) single crystal substrate.

In Example 2, the compound B was changed to 4-carboxyl-2',4',5',7'-tetraiodofluorescein, the substrate was immersed in a dimethylformamide solution containing the compound B at a concentration of $5 \times 10^{-4}$ mol/l, and allowed to react at a temperature of 90° C. for 24 hours under dry nitrogen atmosphere. An FT-IR measurement and an XPS measurement were conducted in the same manner as in Example 2.

Figure 17:
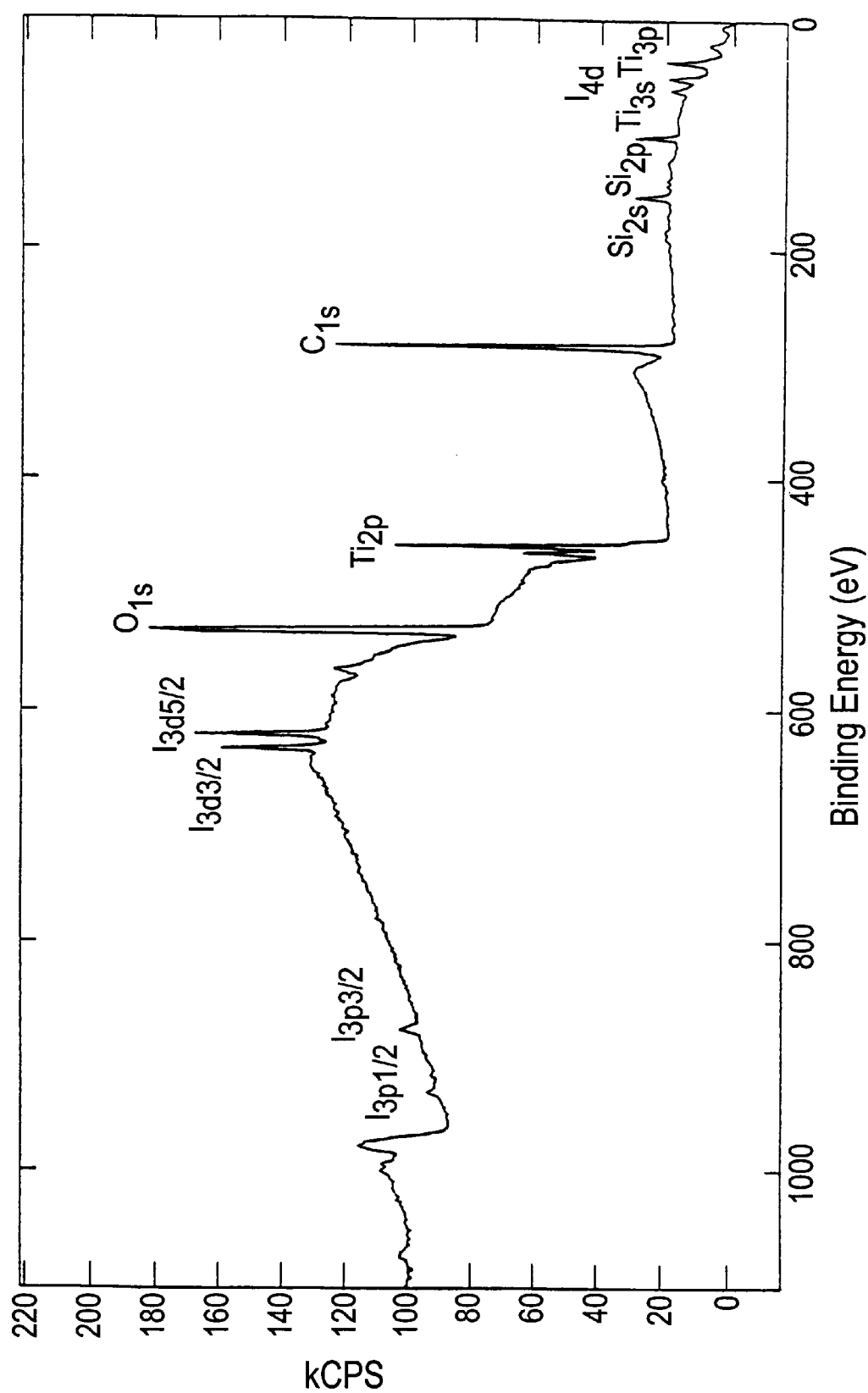
FIG. 17 is a drawing showing a data of an X-ray photoelectron spectrum regarding a thin film in the composite material of Example 15.

In the XPS measurement, 3d, 3p and 3s signals from a Br atom decreased and a signal of 3p1/2 around 930 eV, a signal of 3p3/2 around 874 eV, a signal of 3d3/2 around 630 eV, a signal of 3d5/2 around 620 eV and a signal of 4d around 50 eV from an I atom of 4-carboxy-2',4',5',7'-tetraiodofluorescein were observed, as shown in the spectrum data of FIG. 17.

In the FT-IR measurement, a signal due to symmetric stretch vibration of a >C=O group of 4-carboxy-2',4',5',7'-tetraiodofluorescein was observed around 1720 $cm^{-1}$.

Further, a signal having a peak around 550 nm was observed using ultraviolet visible absorption measurement. This absorption spectrum approximately corresponded to a ultraviolet visible absorption spectrum of a 4-carboxy-2',4',5',7'-tetraiodofluorescein/ethanol solution in the spectrum shape and the peak wavelength.

From the above-described data, it was confirmed that 4-carboxy-2',4',5',7'-tetraiodofluorescein was fixed to the substrate.

Figure 18:
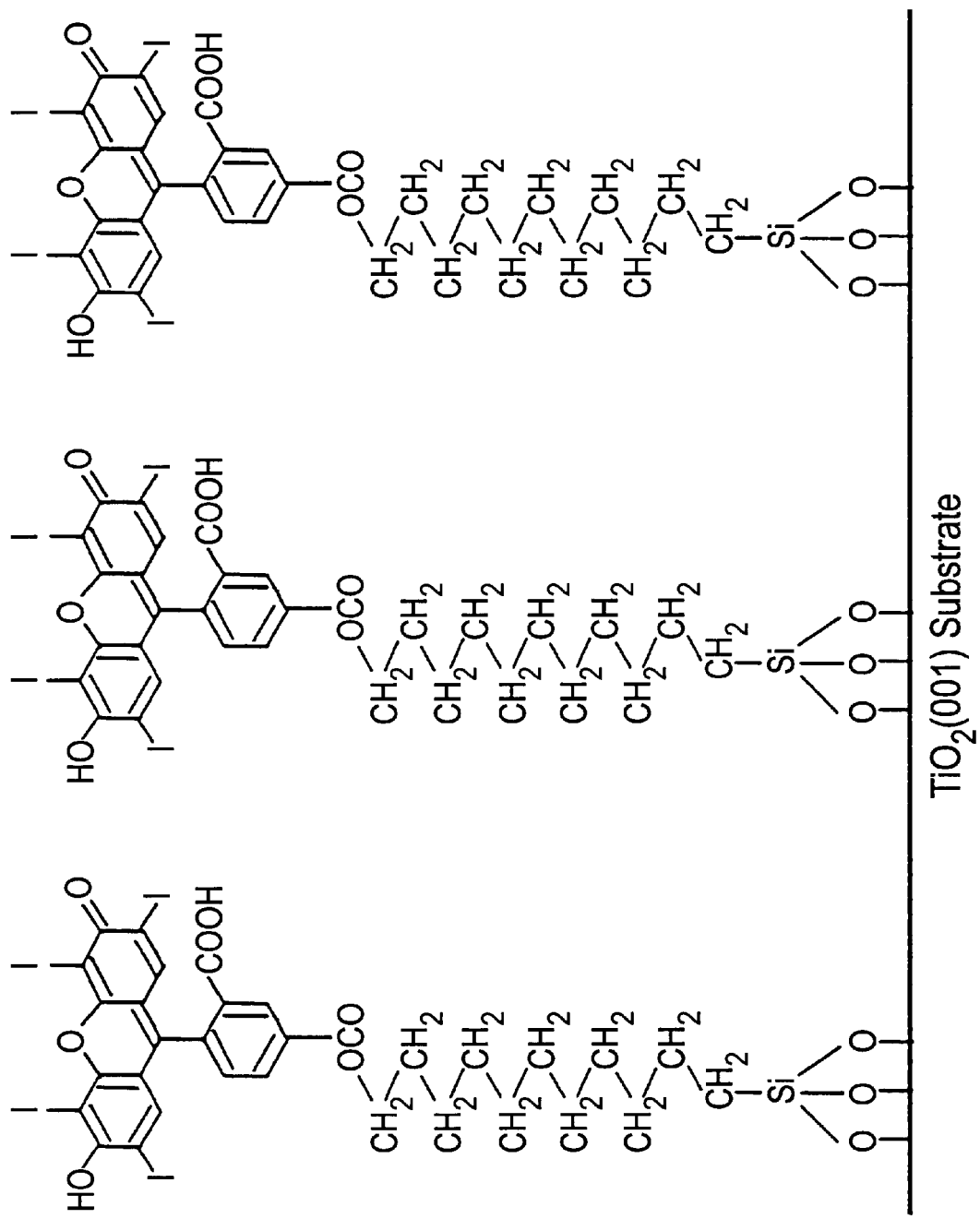
FIG. 18 is a schematic drawing showing a bonding condition at molecular level of a $TiO_2$ (100) single crystal substrate with a thin film to which 4-carboxy-2',4',5',7'-tetraiodofluorescein molecules are fixed in the composite material of Example 15.

FIG. 18 shows a schematic drawing showing the bonding condition at molecular level between the titanium oxide single crystal substrate and the thin film to which a 4-carboxy-2',4',5',7'-tetraiodofluorescein molecule is fixed in the composite material of Example 14.

This composite material was heated at a temperature of 150° C. for 12 hours. It was found that separation of the thin film from the composite material did not occur, and the composite material had an excellent heat resistance.

Example 16

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 11-bromomethyltrichlorosilane [11-Br$(CH_2)_{11}SiCl_3$]. The substrate was changed to a titanium plate (manufactured by NIRAKO K.K., plate shape, thickness; 0.5 mm, purity; 99.5%). The substrate was immersed in the solution A for 1 hour. The substrate after immersion in the solution A was washed with n-hexadecane and acetone instead of toluene and acetone.

An FT-IR measurement and an XPS measurement were conducted in the same manner as in Example 2. It was confirmed that 11-bromomethyltrichlorosilane bonded to the titanium plate substrate.

In Example 2, the compound B was changed to 2',4',5',7'-tetraiodofluorescein, the substrate was immersed in a dimethylformamide solution containing the above-described compound B at a concentration of $5 \times 10^{-4}$ mol/l, and allowed to react at a temperature of 90° C. for 24 hours under dry nitrogen atmosphere. An FT-IR measurement and an XPS measurement were conducted in the same manner as in Example 2.

In the XPS measurement, 3d, 3p and 3s signals from a Br atom disappeared and a signal of 3p1/2 around 930 eV, a signal of 3p3/2 around 874 eV, a signal of 3d3/2 around 630 eV, a signal of 3d5/2 around 620 eV and a signal of 4d around 50 eV from an I atom of 2',4',5',7'-tetraiodofluorescein were observed.

In the FT-IR measurement, a signal due to symmetric stretch vibration of a >C=O group of 2',4',5',7'-tetraiodofluorescein was observed around 1720 $cm^{-1}$.

From the above-described data, it was confirmed that 2',4',5',7'-tetraiodofluorescein was fixed to the substrate.

Example 17

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 11-bromomethyltrichlorosilane [11-Br $(CH_2)_{11}SiCl_3$]. The substrate was changed to a Ge (100) single crystal (manufactured by NIRAKO K.K., plate shape). Germanium oxide was contained in the surface of this substrate. The substrate was immersed in the solution A for 1 hour. The substrate after immersion in the solution A was washed with n-hexadecane and acetone instead of toluene and acetone.

An FT-IR measurement and an XPS measurement were conducted in the same manner as in Example 2.

In the FT-IR measurement, signals due to symmetric stretch vibration and anti-symmetric stretch vibration of a —$CH_2$— group were observed around 2840 to 2930 $cm^{-1}$ similarly to Example 1.

In the XPS measurement, a signal of 3d around 70 eV, a signal of 3p around 180 eV and a signal of 3s around 256 eV from a Br atom and a signal of 3d around 29 eV, a signal of 2p around 122 eV and a signal of 3s around 181 eV from a Ge atom were observed. A signal from a Cl atom was not simultaneously observed, and therefore, it was confirmed that de-hydrochloric acid reaction has occurred.

From the above-described data, it was confirmed that 11-bromomethyltrichlorosilane bonded to the Ge (100) single crystal substrate.

In Example 2, the compound B was changed to 4-carboxyl-2',4',5',7'-tetraiodofluorescein, the substrate was immersed in a dimethylformamide solution containing the compound B at a concentration of $5 \times 10^{-4}$ mol/l, and allowed to react at a temperature of 90° C. for 24 hours under dry nitrogen atmosphere. An FT-IR measurement and an XPS measurement were conducted in the same manner as in Example 2.

In the XPS measurement, 3d, 3p and 3s signals from a Br atom decreased and a signal of 3p1/2 around 930 eV, a signal of 3p3/2 around 874 eV, a signal of 3d3/2 around 630 eV, a signal of 3d5/2 around 620 eV and a signal of 4d around 50 eV from an I atom of 4-carboxy-2',4',5',7'-tetraiodofluorescein were observed.

In the FT-IR measurement, a signal due to symmetric stretch vibration of a >C=O group of 4-carboxy-2',4',5', 7'tetraiodofluorescein was observed around 1720 $cm^{-1}$.

From the above-described data, it was confirmed that 4-carboxy-2',4',5',7'-tetraiodofluorescein was fixed to the substrate.

This composite material was heated at a temperature of 150° C. for 12 hours. It was found that separation of the thin film from the composite material did not occur, and the composite material had an excellent heat resistance.

Example 18

A composite material was prepared in the same manner as in Example 2 except that the following changes were made in Example 2.

In the solution A of Example 2, the compound A was changed to 3-bromopropyltrimethoxysilane [3-Br$(CH_2)_3$Si $(OCH_3)_3$], and pH was adjusted to 4.5 to 5.5 by adding acetic acid. The substrate was changed to one obtained by heating a titanium oxide fine particle (manufactured by Tayka Corp., MT-150AW, rutile type, specific surface area; 80 to 110 $m^2$/g, average primary particle diameter; about 15 nm) at 100° C. for 8 hours. 25 g of this titanium oxide fine particle was charged into a round bottom flask together with the above-described solution A, and the mixture was refluxed at 60° C. for 36 hours under dry nitrogen atmosphere. The mixture was then filtered through a filter to separate only titanium oxide fine particle. This titanium oxide fine particle was stirred in toluene for 3 hours before filtration and further stirred in ethanol for 3 hours before filtration. The resultant titanium oxide fine particle was heated at 80° C. in vacuo (about $10^{-2}$ Torr) to be dried.

An FT-IR measurement and an XPS measurement were conducted in the same manner as in Example 2. It was confirmed that 3-bromoropropyltrimethoxysilane bonded to the titanium oxide fine particle.

Then, this titanium oxide fine particle was immersed in a solution obtained by dissolving 4-carboxy-2',4',5',7'-tetraiodofluorescein in dimethylformamide to make a concentration of $5 \times 10^{-4}$ mol/l, in the same manner as in Example 14, and allowed to react at a temperature of 92° C. for 36 hours under dry nitrogen atmosphere. The resulting mixture was filtered through a filter to separate only titanium oxide fine particle, and the obtained fine particle was mixed in ethyl alcohol and the mixture was stirred for 1 hour, and then filtered. This process was repeated twice. The filtered titanium oxide fine particle was naturally dried for 1 day under nitrogen atmosphere. An FT-IR measurement and an XPS measurement were conducted in the same manner as in Example 2. In the FT-IR measurement, a signal due to stretch vibration of a >C=O group of a carboxyl group was observed around 1720 $cm^{-1}$. In the XPS measurement, 3d, 3p and 3s signals from a Br atom decreased and a signal of 3p1/2 around 930 eV, a signal of 3p3/2 around 874 eV, a signal of 3d3/2 around 630 eV, a signal of 3d5/2 around 620 eV and a signal of 4d around 50 eV from an I were observed.

From the above-described data, it was confirmed that 4-carboxy-2',4',5',7'-tetraiodofluorescein was fixed to the titanium oxide fine particle.

This composite material was heated at a temperature of 150° C. for 12 hours. It was found that separation of the thin film from the composite material did not occur, and the composite material had an excellent heat resistance.

Example 19

A composite material was prepared in the same manner as in Example 2 except that the following changes were made in Example 2.

In the solution A of Example 2, the compound A was changed to (3-glycidoxypropyl)trimethoxysilane [$CH_2OCH$—O—$(CH_2)_3Si(OCH_3)_3$], and pH was adjusted to 4.5 to 5.5 by adding acetic acid. The substrate was changed to one obtained by heating a titanium oxide fine particle (manufactured by Tayka Corp., MT-150AW, rutile type, specific surface area; 80 to 110 $m^2$/g, average primary particle diameter; about 15 nm) at 100° C. for 8 hours. 25 g of this titanium oxide fine particle was charged into a round bottom flask together with the solution A, and the mixture was stirred for 1 hour under dry nitrogen atmosphere. Then the mixture was filtered through a filter to separate only titanium oxide fine particle. This titanium oxide fine particle was stirred in toluene for 3 hours before filtration and further stirred in ethanol for 3 hours before filtration. The resulting titanium oxide fine particle was heated at 110° C. in vacuo (about $10^{-2}$ Torr) for 24 hours to be dried.

An FT-IR measurement and an XPS measurement were conducted in the same manner as in Example 2. It was confirmed that (3-glycidoxypropyl)trimethoxysilane bonded to the titanium oxide fine particle.

In Example 2, the compound B was changed to ethylenediamine, and this substrate was immersed in ethylenediamine, and allowed to react at a temperature of 100° C. for 3 hours under dry nitrogen atmosphere. An FT-IR measurement and an XPS measurement were conducted in the same manner as in Example 2.

In the XPS measurement, a 1s signal of an N atom was observed around 400 eV. In the FT-IR measurement, it was observed that signals due to symmetric stretch vibration and anti-symmetric stretch vibration of a —$CH_2$— group increased around 2840 to 2930 $cm^{-1}$.

From the above-described data, it was confirmed that ethylenediamine was fixed to the substrate.

Example 20

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 8-bromooctyltrichlorosilane [8-Br($CH_2$)$_8$SiCl$_3$]. The substrate was immersed in the solution A for 1 hour. The substrate after immersion in the solution A was washed with n-hexadecane and acetone instead of toluene and acetone.

An FT-IR measurement and an XPS measurement were conducted in the same manner as in Example 2. It was confirmed that 8-bromooctyltrichlorosilane bonded to the Si (100) single crystal substrate.

In Example 2, the compound B was changed to 2,4,5,7-tetraiodo-9-(2-methoxycarbonylphenyl)-6-hydroxy-3H-xanthene-3-ene, the substrate was immersed in a dimethylformamide solution containing the compound B at a concentration of 5×$10^{-4}$ mol/l, and allowed to react at a temperature of 90° C. for 24 hours under dry nitrogen atmosphere. An FT-IR measurement and an XPS measurement were conducted in the same manner as in Example 2.

Figure 19:
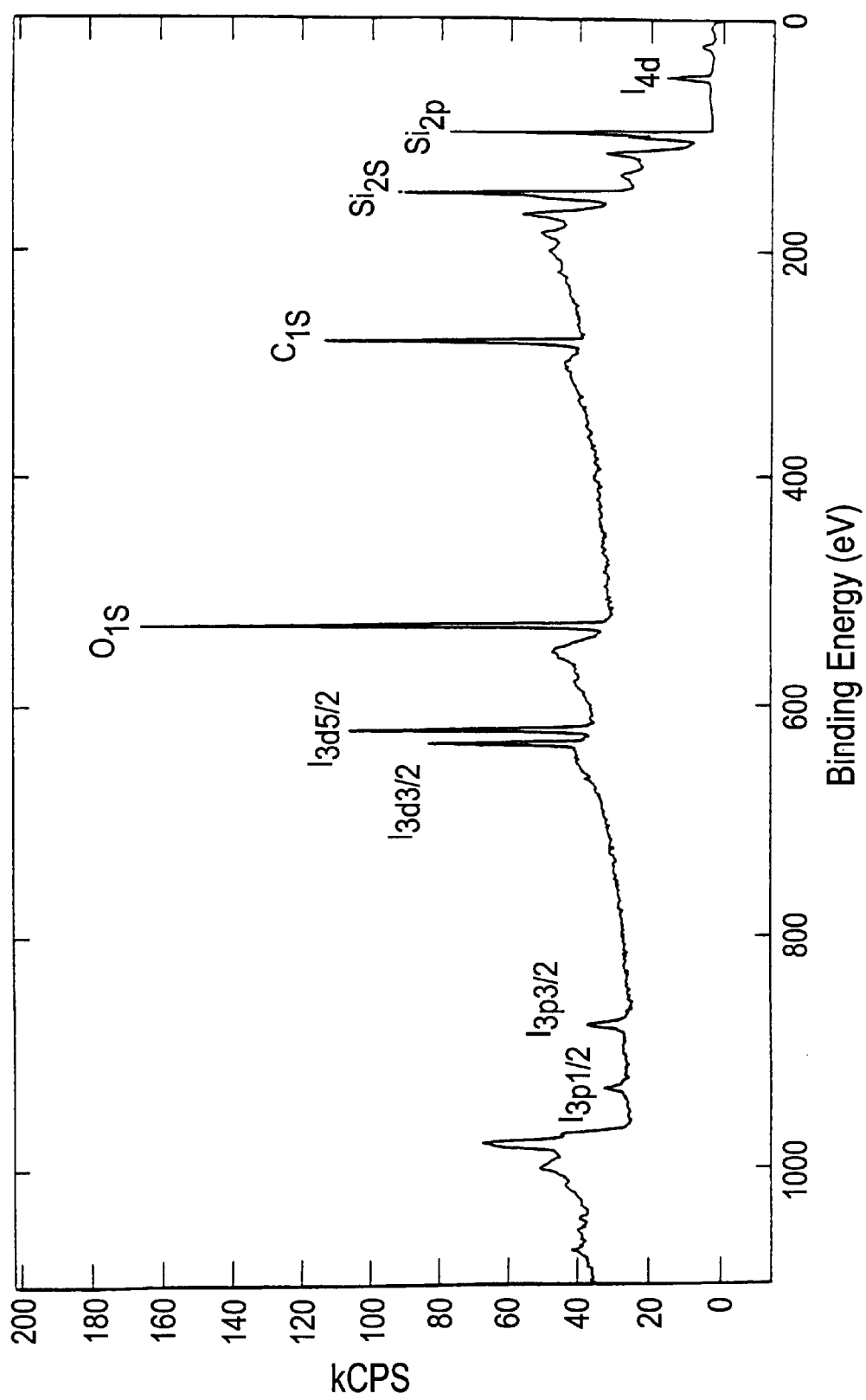
FIG. 19 is a drawing showing a data of an X-ray photoelectron spectrum regarding a thin film in the composite material of Example 20.

In the XPS measurement, as shown in the spectrum data of FIG. 19, signals 3d, 3p, 3s from a Br atom disappeared, and a signal of 3p1/2 around 930 eV, a signal of 3p3/2 around 874 eV, a signal of 3d3/2 around 630 eV, a signal of 3d5/2 around 620 eV and a signal of 4d around 50 eV from an I atom of 2,4,5,7-tetraiodo-9-(2-methoxycarbonylphenyl)-6-hydroxy-3H-xanthene-3-ene were observed.

Figure 20:
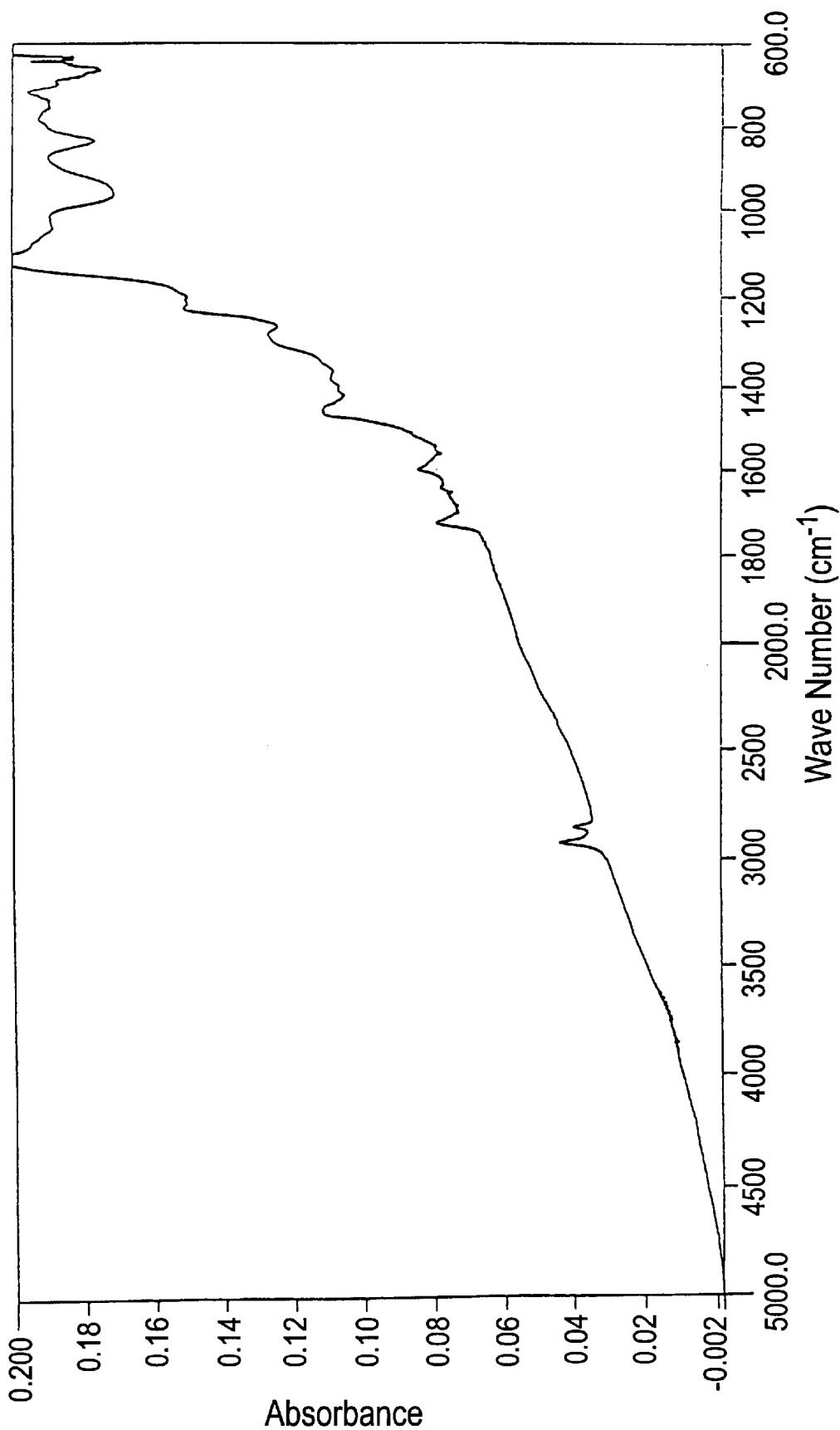
FIG. 20 is a drawing showing a data of a Fourier transform infrared absorption spectrum regarding a thin film in the composite material of Example 20.

In the FT-IR measurement, as shown in the spectrum data of FIG. 20, a signal due to symmetric stretch vibration of a >C=O group of 2,4,5,7-tetraiodo-9-(2-methoxycarbonylphenyl)-6-hydroxy-3H-xanthene-3-ene was observed.

From the above-described data, it was confirmed that 2,4,5,7-tetraiodo-9-(2-methoxycarbonylphenyl)-6-hydroxy-3H-xanthene-3-ene was fixed to the substrate.

Figure 21:
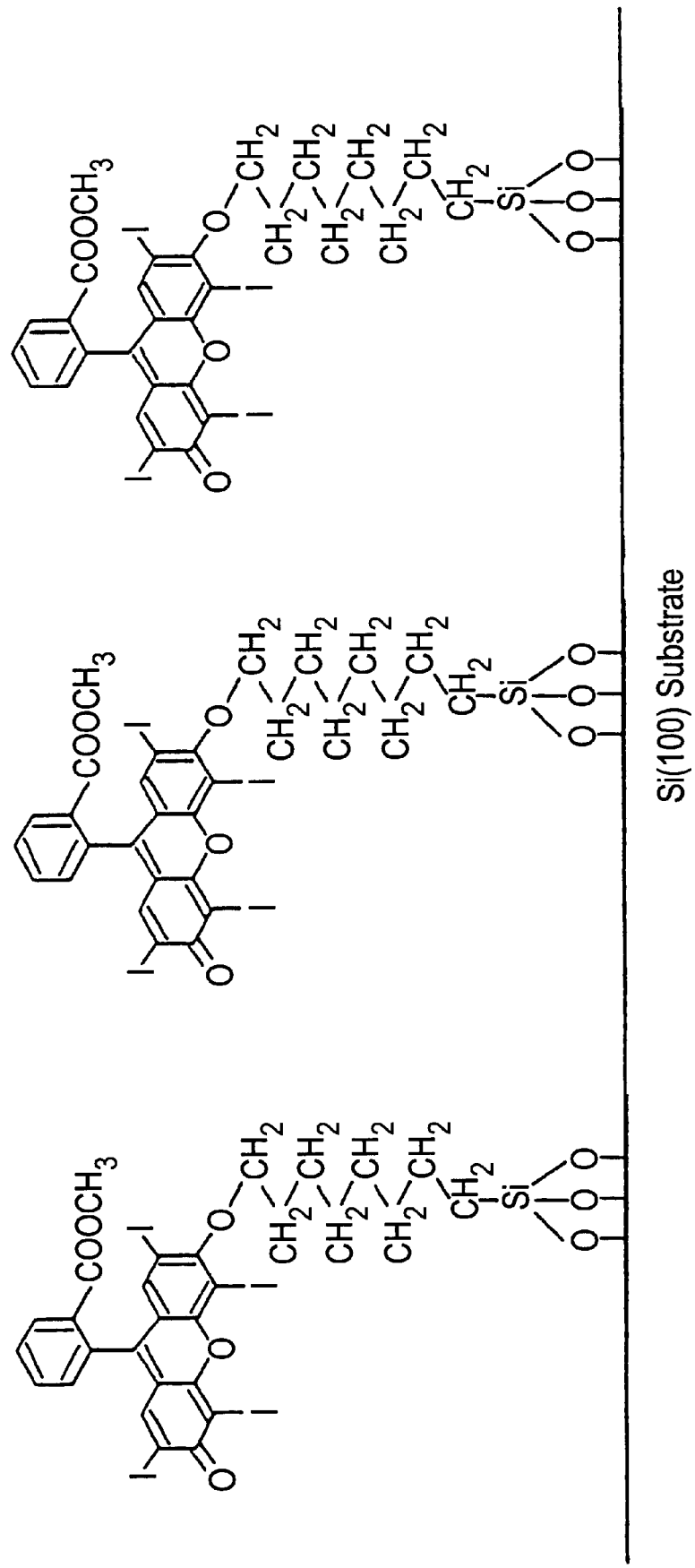
FIG. 21 is a schematic drawing showing a bonding condition at molecular level of an Si (100) single crystal substrate with a thin film to which 2,4,5,7-tetraiodo-9-(2-methoxycarbonylphenyl)-6-hydroxyl-3H-xanthene-3-en molecules are fixed in the composite material of Example 20.

FIG. 21 shows a schematic drawing showing the bonding condition at molecular level between the silicon single crystal (100) substrate and the thin film to which 2,4,5,7-tetraiodo-9-(2-methoxycarbonylphenyl)-6-hydroxy-3H-xanthene-3-ene molecules are fixed in the composite material of Example 20.

This composite material was heated at a temperature of 150° C. for 12 hours. It was found that separation of the thin film from the composite material did not occur, and the composite material had an excellent heat resistance.

Example 21

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 11-bromoundecyltrichlorosilane [11-Br($CH_2$)$_{11}$SiCl$_3$]. The substrate was changed to a titanium plate (manufactured by NIRAKO K.K., plate shape, thickness; 0.5 mm, purity; 99.5%). The substrate was immersed in the solution A for 1 hour. The substrate after immersion in the solution A was washed with n-hexadecane and acetone instead of toluene and acetone.

An FT-IR measurement and an XPS measurement were conducted in the same manner as in Example 2. It was confirmed that 11-bromoundecyltrichlorosilane bonded to the titanium plate substrate.

In Example 2, the compound B was changed to 2,4,5,7-tetraiodo-9-(2-methoxycarbonylphenyl)-6-hydroxy-3H-xanthene-3-ene, the substrate was immersed in a dimethylformamide solution containing the above-described compound B at a concentration of 5×$10^{-4}$ mol/l, and allowed to react at a temperature of 90° C. for 24 hours under dry nitrogen atmosphere. An FT-IR measurement and an XPS measurement were conducted in the same manner as in Example 2.

In the XPS measurement, signals 3d, 3p, 3s from a Br atom disappeared, and a signal of 3p1/2 around 930 eV, a signal of 3p3/2 around 874 eV, a signal of 3d3/2 around 630 eV, a signal of 3d5/2 around 620 eV and a signal of 4d around 50 eV from an I atom of 2,4,5,7-tetraiodo-9-(2-methoxycarbonylphenyl)-6-hydroxy-3H-xanthene-3-ene were observed.

In the FT-IR measurement, a signal due to symmetric stretch vibration of a >C=O group of 2,4,5,7-tetraiodo-9-(2-methoxycarbonylphenyl)-6-hydroxy-3H-xanthene-3-ene was observed around 1720 $cm^{-1}$.

From the above-described data, it was confirmed that 2,4,5,7-tetraiodo-9-(2-methoxycarbonylphenyl)-6-hydroxy-3H-xanthene-3-ene was fixed to the substrate.

This composite material was heated at a temperature of 150° C. for 12 hours. It was found that separation of the thin film from the composite material did not occur, and the composite material had an excellent heat resistance.

Example 22

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 3-bromopropyltrichlorosilane [3-Br($CH_2$)$_3$ SiCl$_3$]. The substrate was immersed in the solution A for 1 hour. The substrate after immersion in the solution A was washed with n-hexadecane and acetone instead of toluene and acetone.

An FT-IR measurement and an XPS measurement were conducted in the same manner as in Example 2. It was confirmed that 3-bromopropyltrichlorosilane bonded to the Si (100) single crystal substrate.

In Example 2, the compound B was changed to 9-(2-methoxycarbonylphenyl)-6-hydroxy-3H-xanthene-3-ene, the substrate was immersed in a dimethylformamide solution containing the above-described compound B at a concentration of 5×$10^{-4}$ mol/l, and allowed to react at a temperature of 90° C. for 24 hours under dry nitrogen atmosphere. An FT-IR measurement and an XPS measurement were conducted in the same manner as in Example 2.

In the XPS measurement, signals 3d, 3p, 3s from a Br atom decreased.

In the FT-IR measurement, a signal due to symmetric stretch vibration of a >C=O group of 9-(2-methoxycarbonylphenyl)-6-hydroxy-3H-xanthene-3-ene was observed around 1720 cm$^{-1}$.

From the above-described data, it was confirmed that 9-(2-methoxycarbonylphenyl)-6-hydroxy-3H-xanthene-3-ene was fixed to the substrate.

This composite material was heated at a temperature of 150° C. for 12 hours. It was found that separation of the thin film from the composite material did not occur, and the composite material had an excellent heat resistance.

Example 23

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 3-bromopropyltrichlorosilane [3-Br (CH$_2$)$_3$ SiCl$_3$]. The substrate was change to a strontium titanate (100) single crystal (resistance; 20 to 50 Ωcm, thickness; 0.5 mm). The substrate was immersed in the solution A for 1 hour. The substrate after immersion in the solution A was washed with n-hexadecane and acetone instead of toluene and acetone.

An FT-IR measurement and an XPS measurement were conducted in the same manner as in Example 2. It was confirmed that 3-bromopropyltrichlorosilane bonded to the strontium titanate single crystal substrate.

In Example 2, the compound B was changed to 2',4',5',7'-tetraiodofluorescein, the substrate was immersed in a dimethylformamide solution containing the above-described compound B at a concentration of 5×10$^{-4}$ mol/l, and allowed to react at a temperature of 90° C. for 24 hours under dry nitrogen atmosphere. An FT-IR measurement and an XPS measurement were conducted in the same manner as in Example 2.

In the XPS measurement, 3d, 3p and 3s signals from a Br atom disappeared and a signal of 3p1/2 around 930 eV, a signal of 3p3/2 around 874 eV, a signal of 3d3/2 around 630 eV, a signal of 3d5/2 around 620 eV and a signal of 4d around 50 eV from an I atom of 2',4',5',7'-tetraiodofluorescein were observed.

In the FT-IR measurement, a signal due to symmetric stretch vibration of a >C=O group of 2',4',5',7'-tetraiodofluorescein was observed around 1720 cm$^{-1}$.

From the above-described data, it was confirmed that 2',4',5',7'-tetraiodofluorescein was fixed to the substrate.

Example 24

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 3-bromopropyltrichlorosilane [3-Br (CH$_2$)$_3$ SiCl$_3$]. The substrate was immersed in the solution A for 1 hour. The substrate after immersion in the solution A was washed with n-hexadecane and acetone instead of toluene and acetone.

An FT-IR measurement and an XPS measurement were conducted in the same manner as in Example 2. It was confirmed that 3-bromopropyltrichlorosilane bonded to the Si (100) single crystal substrate.

In Example 2, the compound B was changed to ruthenium (2,2-bipyridyl-4,4'-di-4,4'-dicarboxylate)$_2$($\mu$-(cyano) ruthenium(cyano)(2,2-bipyridyl)$_2$)$_2$, cis-di(tiocyanate)bis(2,2-bipyridyl-4,4'-di-4,4'-dicarboxylate) ruthenium (II), the substrate was immersed in a dimethylformamide solution containing the above-described compound B at a concentration of 5×10$^{-4}$ mol/l, and allowed to react at a temperature of 92° C. for 24 hours under dry nitrogen atmosphere. An FT-IR measurement and an XPS measurement were conducted in the same manner as in Example 2.

Figure 22:
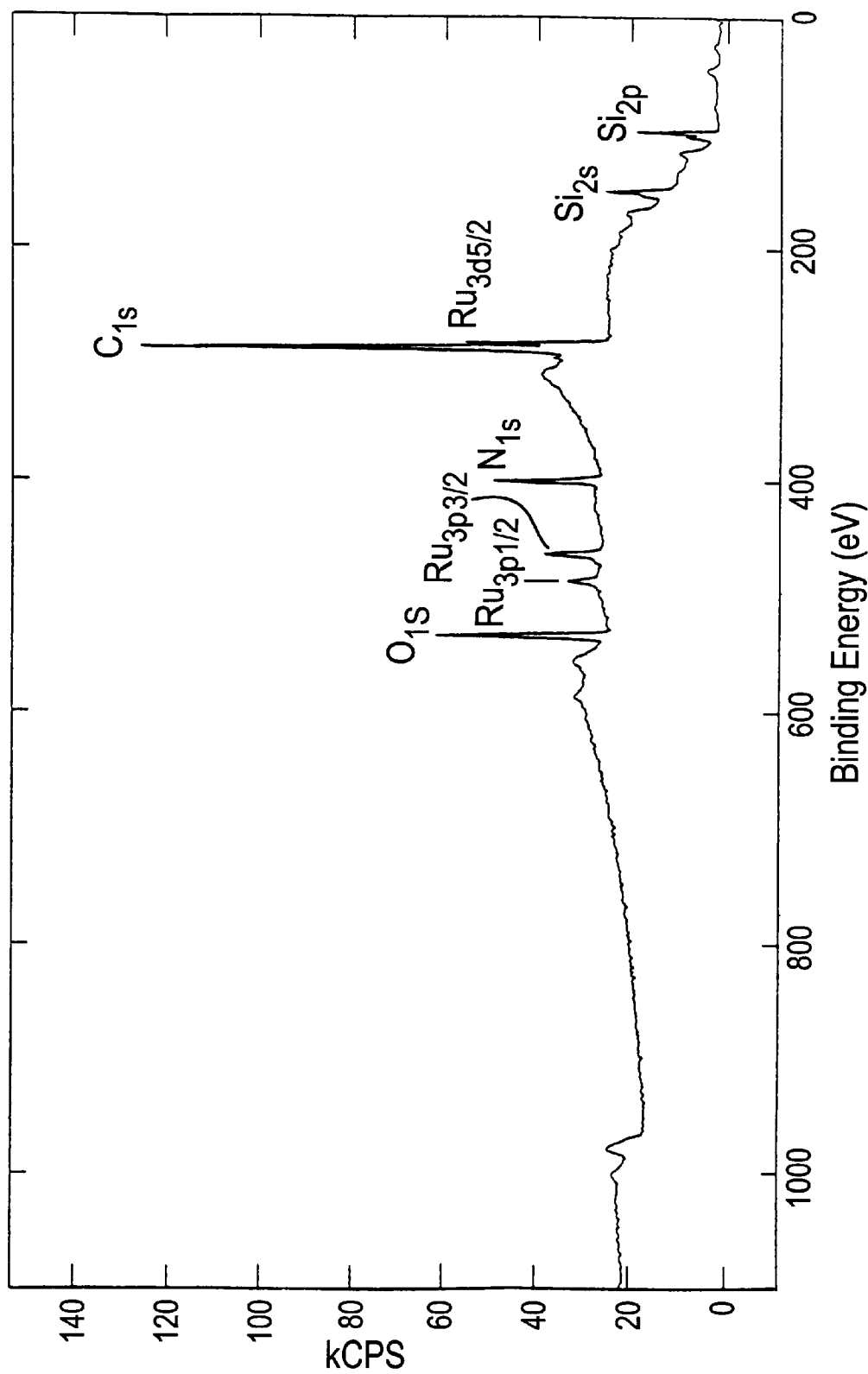
FIG. 22 is a drawing showing a data of an X-ray photoelectron spectrum regarding a thin film in the composite material of Example 24.

In the XPS measurement, as shown in the spectrum data of FIG. 22, signals 3d, 3p, 3s from a Br atom disappeared, and a 1s signal of a N atom of ruthenium(2,2-bipyridyl-4,4'-di-4,4'-dicarboxylate)$_2$($\mu$-(cyano)ruthenium(cyano)(2,2-bipyridyl)$_2$)$_2$, cis-di(tiocyanate)bis(2,2-bipyridyl-4,4'-di-4,4'-dicarboxylate)ruthenium (II) was observed around 400 eV and a signal 3d5/2 around 280 eV, a signal 3p3/2 around 462 eV and a signal 3p1/2 around 484 eV of a Ru atom of ruthenium(2,2-bipyridyl-4,4'-di-4,4'-dicarboxylate)$_2$($\mu$-(cyano)ruthenium(cyano)(2,2-bipyridyl)$_2$)$_2$, cis-di (tiocyanate)bis(2,2-bipyridyl-4,4'-di-4,4'-dicarboxylate) ruthenium (II) were observed.

Figure 23:
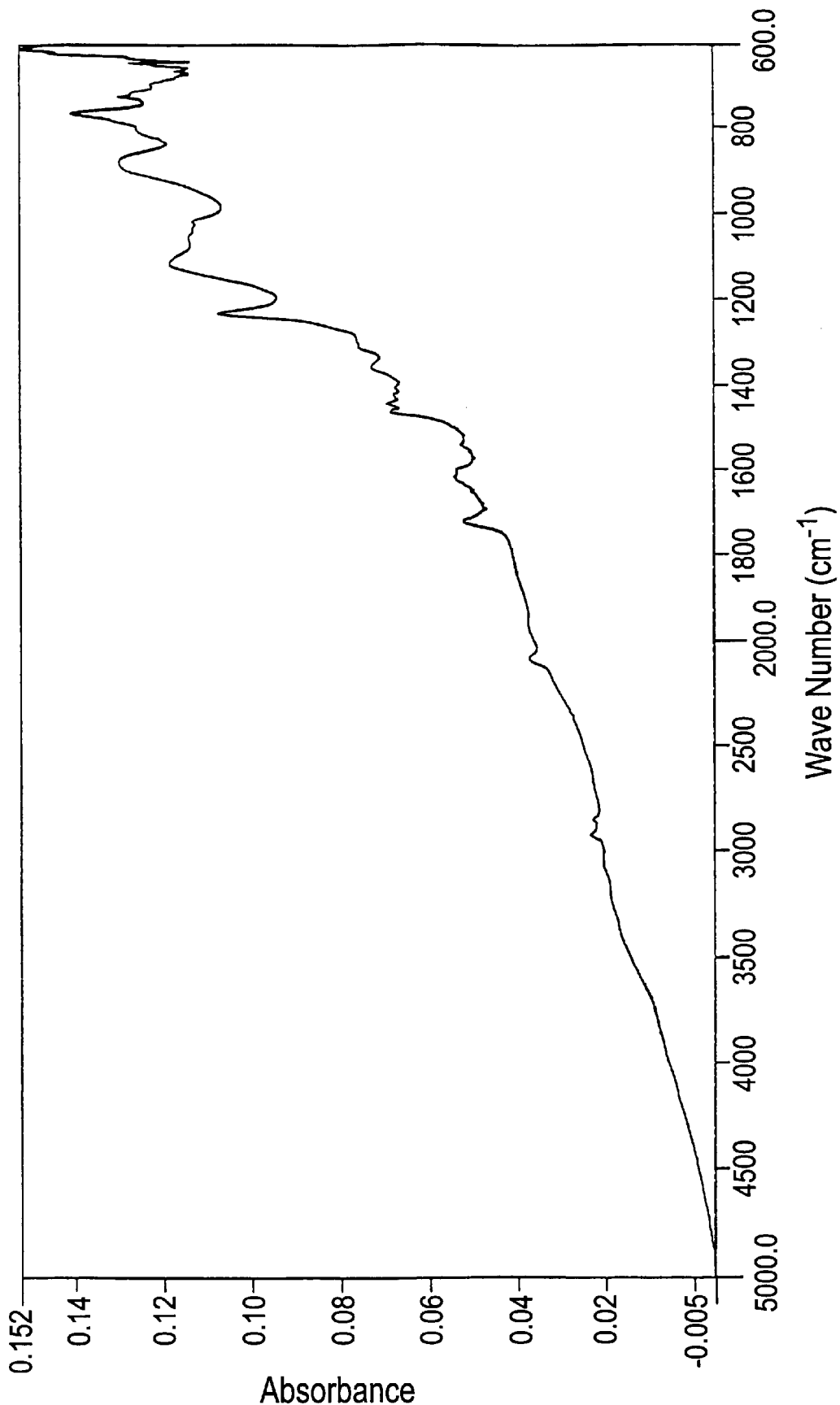
FIG. 23 is a drawing showing a data of a Fourier transform infrared absorption spectrum regarding a thin film in the composite material of Example 24.

In the FT-IR measurement, as shown in the spectrum data of FIG. 23, a signal due to symmetrical stretch vibration of a >C=O group of ruthenium(2,2-bipyridyl-4,4'-di-4,4'-dicarboxylate)$_2$($\mu$-(cyano)ruthenium(cyano)(2,2-bipyridyl)$_2$)$_2$, cis-di(tiocyanate)bis(2,2-bipyridyl-4,4'-di-4, 4'-dicarboxylate)ruthenium (II) around 1720 cm$^1$ and a signal due to stretch vibration of a CN group around 2100 cm$^{-1}$ were observed.

From the above-described data, it was confirmed that ruthenium(2,2-bipyridyl-4,4'-di-4,4'-dicarboxylate)$_2$($\mu$-(cyano)ruthenium(cyano)(2,2-bipyridyl)$_2$)$_2$, cis-di (tiocyanate)bis(2,2-bipyridyl-4,4'-di-4,4'-dicarboxylate) ruthenium (II) was fixed to the substrate.

Figure 24:
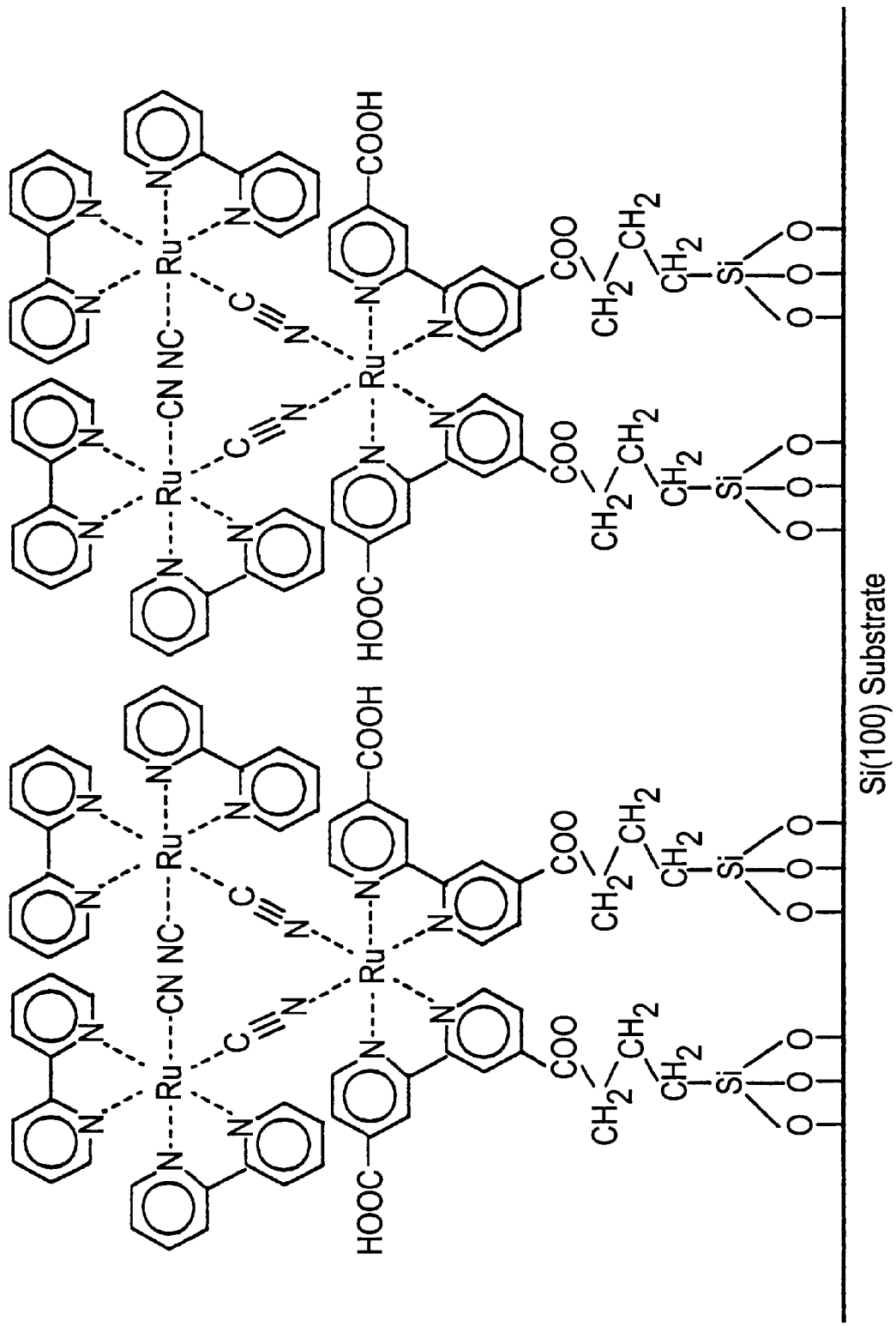
FIG. 24 is a schematic drawing showing a bonding condition at molecular level of an Si (100) single crystal substrate with a thin film to which ruthenium (2,2 bipyridyl-4,4'-di-4,4'-dicarboxylate)$_2$($\mu$-(cyano)ruthenium(cyano)(2, 2-bipyridyl)$_2$)$_2$, cis-di(thiocyanate)bis(2,2-bipyridyl-4,4'-di-4,4'-dicarboxylate)ruthenium (II) molecules are fixed in the composite material of Example 24.

FIG. 24 is a schematic drawing showing the bonding condition at molecular level of an Si (100) single crystal substrate with a thin film to which ruthenium(2,2-bipyridyl-4,4'-di-4,4'-dicarboxylate)$_2$($\mu$-(cyano)ruthenium(cyano)(2, 2-bipyridyl)$_2$)$_2$, cis-di(tiocyanate)bis(2,2-bipyridyl-4,4'-di-4,4'-dicarboxylate)ruthenium (II) is fixed in the composite material of Example 24.

This composite material was heated at a temperature of 150° C. for 12 hours. It was found that separation of the thin film from the composite material did not occur, and the composite material had an excellent heat resistance.

Example 25

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 3-bromopropyltrichlorosilane [3-Br (CH$_2$)$_3$ SiCl$_3$]. The substrate was immersed in the solution A for 1 hour. The substrate was changed to a titanium oxide (001) single crystal and was immersed in the solution A. The substrate after immersion in the solution A was washed with n-hexadecane and acetone instead of toluene and acetone.

An FT-IR measurement and an XPS measurement were conducted in the same manner as in Example 2. It was confirmed that 3-bromopropyltrichlorosilane bonded to the titanium oxide (001) single crystal substrate.

In Example 2, the compound B was changed cis-di(tiocyanate)bis(2,2-bipyridyl-4,4'-di-4,4'-dicarboxylate)ruthenium (II), the substrate was immersed in a dimethylformamide solution containing the above-described compound B at a concentration of $5\times10^{-4}$ mol/l, and allowed to react at a temperature of 92° C. for 24 hours under dry nitrogen atmosphere. An FT-IR measurement and an XPS measurement were conducted in the same manner as in Example 2.

In the XPS measurement, signals 3d, 3p, 3s from a Br atom disappeared, and a 1s signal of a N atom was observed around 400 eV, and a signal 3d5/2 around 280 eV, a signal 3p3/2 around 462 eV anda signal 3p1/2 around 484 eV of a Ru atom were observed.

In the FT-IR measurement, a signal due to symmetrical stretch vibration of a >C=O group of cis-di(tiocyanate)bis(2,2-bipyridyl-4,4'-di-4,4'-dicarboxylate)ruthenium (II) was observed around 1720 cm$^{-1}$. From the above-described data, it was confirmed that cis-di(tiocyanate)bis(2,2-bipyridyl-4,4'-di-4,4'-dicarboxylate)ruthenium (II) was fixed to the substrate via 3-bromopropyltrichlorosilane.

This composite material was heated at a temperature of 150° C. for 12 hours. It was found that separation of the thin film from the composite material did not occur, and the composite material had an excellent heat resistance.

Example 26

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 3-bromopropyltrichlorosilane [3-Br (CH$_2$)$_3$ SiCl$_3$]. The substrate was immersed in the solution A for 1 hour. The substrate after immersion in the solution A was washed with n-hexadecane and acetone instead of toluene and acetone.

An FT-IR measurement and an XPS measurement were conducted in the same manner as in Example 2. It was confirmed that 3-bromopropyltrichlorosilane bonded to the Si (100) single crystal substrate.

In Example 2, the compound B was changed to (tetracarboxyphthalocyanato)cobalt (II), the substrate was immersed in a dimethylformamide solution containing the above-described compound B at a concentration of $5\times10^{-5}$ mol/l, and allowed to react at a temperature of 92° C. for 48 hours under dry nitrogen atmosphere. An FT-IR measurement and an XPS measurement were conducted in the same manner as in Example 2.

Figure 25:
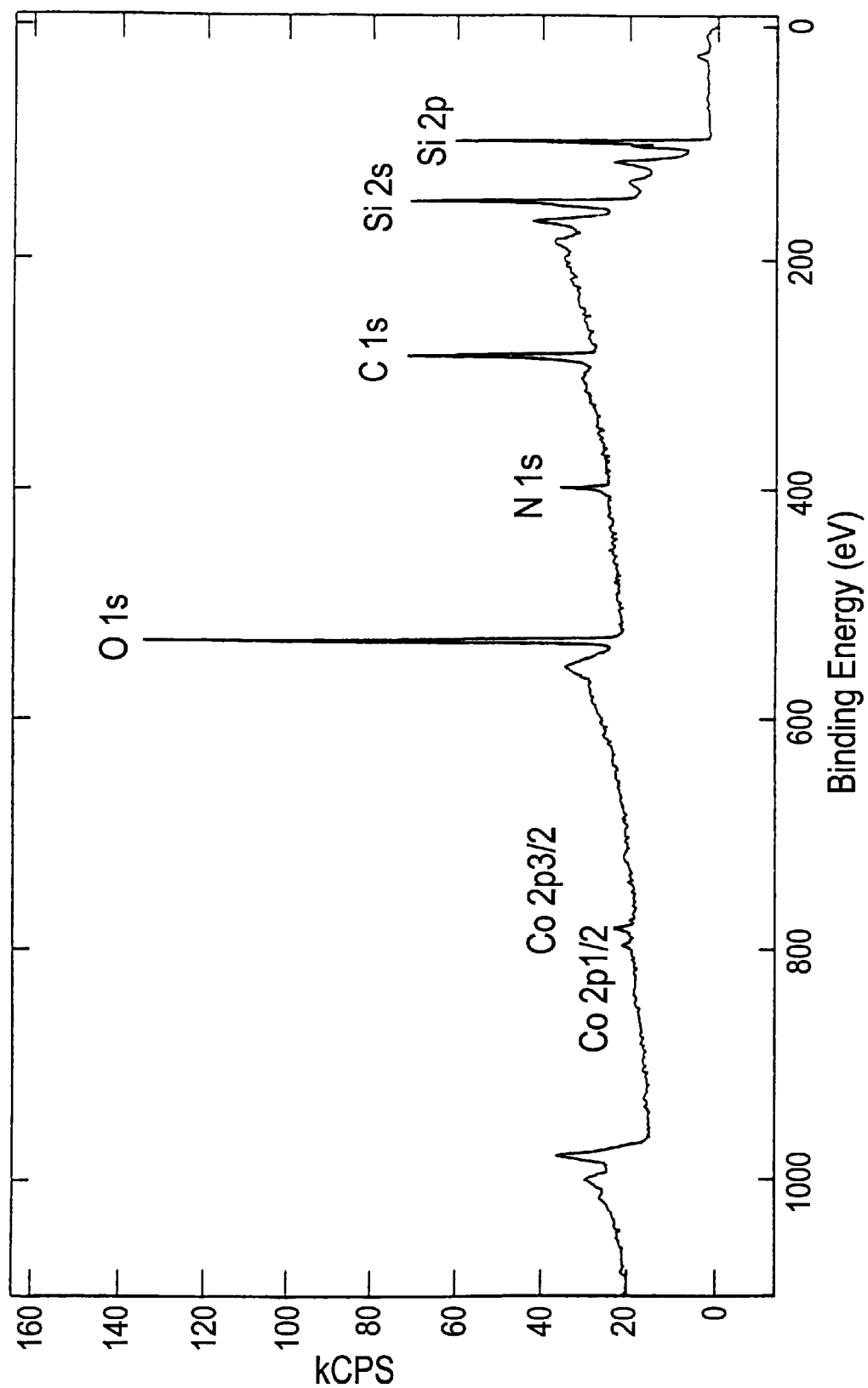
FIG. 25 is a drawing showing a data of an X-ray photoelectron spectrum regarding a thin film in the composite material of Example 26.

In the XPS measurement, as shown in the spectrum data of FIG. 25, signals 3d, 3p, 3s from a Br atom disappeared, and a 1s signal of a N atom of (tetracarboxyphthalocyanato)cobalt (II) was observed around 400 eV, and a signal 3d3/2 around 778 eV and a signal 3p1/2 around 793 eV of a Co atom of (tetracarboxyphthalocyanato)cobalt (II) were observed.

Figure 26:
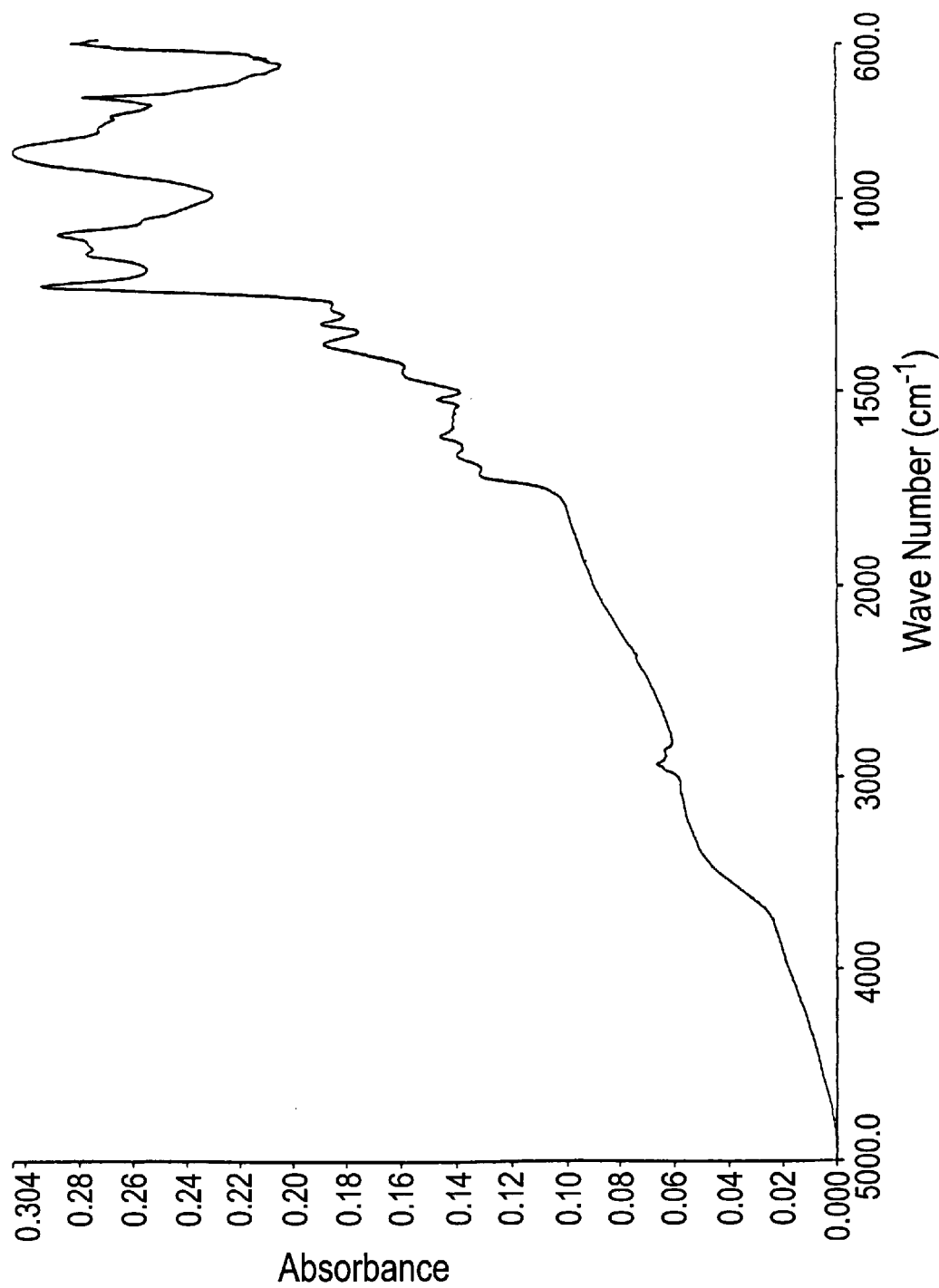
FIG. 26 is a drawing showing a data of a Fourier transform infrared absorption spectrum regarding a thin film in the composite material of Example 26.

In the FT-IR measurement, as shown in the spectrum data of FIG. 26, a signal due to symmetrical stretch vibration of a >C=O group of (tetracarboxyphthalocyanato)cobalt (II) around 1720 cm$^{-1}$ and a signal due to stretch vibration of a CN group around 2100 cm$^{-1}$ were observed.

From the above-described data, it was confirmed that (tetracarboxyphthalocyanato)cobalt (II) was fixed to the substrate via 3-bromopropyltrichlorosilane.

Figure 27:
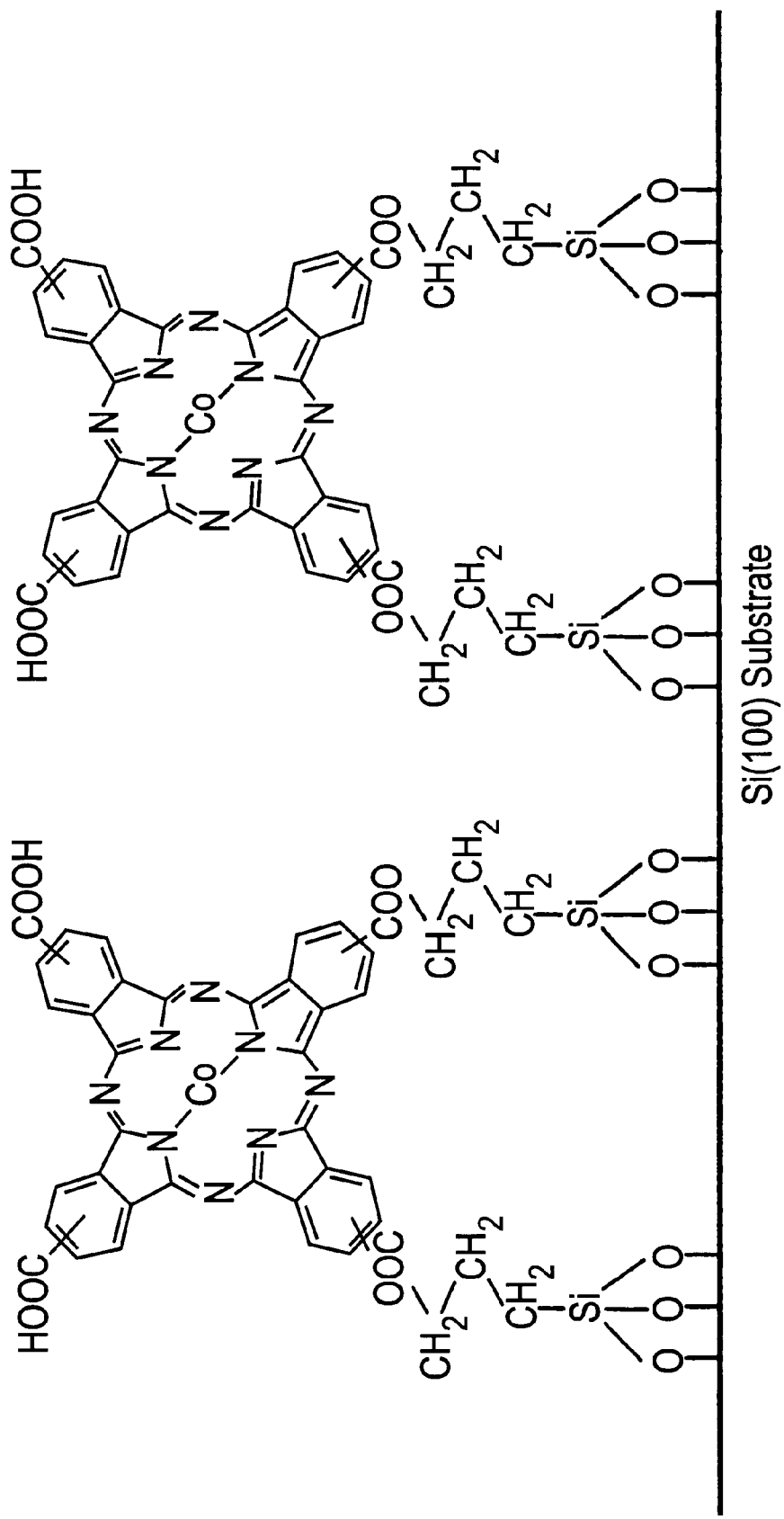
FIG. 27 is a schematic drawing showing a bonding condition at molecular level of an Si (100) single crystal substrate with a thin film to which (tetracarboxyphthalocyanato)cobalt (II) molecules are fixed in the composite material of Example 26.

FIG. 27 is a schematic drawing showing the bonding condition at molecular level of a Si (100) single crystal substrate with a thin film to which (tetracarboxyphthalocyanato)cobalt (II) is fixed in the composite material of Example 24.

This composite material was heated at a temperature of 150° C. for 12 hours. It was found that separation of the thin film from the composite material did not occur, and the composite material had an excellent heat resistance.

Example 27

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to 3-bromopropyltrichlorosilane [3-Br (CH$_2$)$_3$ SiCl$_3$]. The substrate was changed to a titanium oxide (001) single crystal and was immersed in the solution A. The substrate after immersion in the solution A was washed with n-hexadecane and acetone instead of toluene and acetone.

An FT-IR measurement and an XPS measurement were conducted in the same manner as in Example 2. It was confirmed that 3-bromopropyltrichlorosilane bonded to the titanium oxide (001) single crystal substrate.

In Example 2, the compound B was changed to (tetraaminophthalocyanato)copper (II), the substrate was immersed in a dimethylformamide solution containing the above-described compound B at a concentration of $5\times10^{-5}$ mol/l, and allowed to react at a temperature of 92° C. for 24 hours under dry nitrogen atmosphere. An FT-IR measurement and an XPS measurement were conducted in the same manner as in Example 2.

In the XPS measurement, signals 3d, 3p, 3s from a Br atom disappeared, and a 1s signal of a N atom was observed around 400 eV, andasignal 3d3/2 around 933 eV and a signal 3p1/2 around 953 eV of a Cu atom were observed.

In the FT-IR measurement, a signal of (tetraaminophthalocyanato)copper (II) was observed.

From the above-described data, it was confirmed that (tetraaminophthalocyanato)copper (II) was fixed to the substrate.

This composite material was heated at a temperature of 150° C. for 12 hours. It was found that separation of the thin film from the composite material did not occur, and the composite material had an excellent heat resistance.

Comparative Example 1

A composite material was prepared in the same manner as in Example 2 except that the following changes were made in Example 2.

In the solution A of Example 2, toluene was changed to a mixed solvent obtained by mixing n-hexadecane and carbon tetrachloride at a ratio (by volume) of 4:1 and the compound A was changed to bis(dimethylchlorosilyl)octane [Cl(CH$_3$)$_2$ Si(CH$_2$)$_8$Si(CH$_3$)$_2$Cl], and the concentration of the above-described compound A in the solution A was changed to $10^{-2}$ mol/l. The substrate was immersed in the solution A for 1 hour. The substrate after immersion in the solution A was washed with n-hexadecane and acetone instead of toluene and acetone. The substrate was naturally dried for 30 minutes under nitrogen atmosphere, and then no heating was conducted.

Next, this substrate was immersed in a chloroform solution containing 5% by weight of aniline for 3 hours. Then, the substrate was washed with ethyl alcohol and acetone, and was naturally dried for 30 minutes under dry nitrogen atmosphere.

An FT-IR measurement and an XPS measurement were conducted in the same manner as in Example 2. In the XPS measurement, a 1s signal of a N atom around 400 eV can be slightly observed.

In the FT-IR measurement, no C—C stretch vibration of a benzene ring can be observed around 1500 cm$^{-1}$ and 1600 cm$^{-1}$.

Comparative Example 2

A composite material was prepared in the same manner as in Comparative Example 1 except that the compound B was changed to a chloroform solution containing 5% by weight of pyrrole.

An XPS measurement was conducted in the same manner as in Comparative Example 1, a 1s signal of a N atom was slightly observed around 400 eV.

Comparative Example 3

A composite material was prepared in the same manner as in Example 2 except that the following changes were made in Example 2.

In the solution A of Example 2, the compound A was changed to γ-aminopropyltriethoxysilane, and the content of the above-described compound A in the solution A was changed to 5×10$^{-2}$ mol/l. The substrate was refluxed in the solution A at a temperature of 110° C. for 7 hours. The substrate was naturally dried for 30 minutes under nitrogen atmosphere, and then no heating was conducted.

Next, an XPS measurement was conducted in the same manner as in Example 2, and a 1s signal of a N atom around 400 eV was slightly observed. In the FT-IR measurement, signals due to symmetric stretch vibration and antisymmetric stretch vibration of a —CH$_2$— group around 2840 to 2930 cm$^{-1}$ were observed only slightly.

According to the present invention, the above-described conventional problems can be resolved. According to the present invention, there can be provided a composite material which is obtained by strongly bonding, to the surface of a substrate, a thin film in which a functional molecule is introduced at a high density and the functional molecule is oriented so as to expose on the surface.

The composite material is suitable for controlling the physical properties of the surface and interface of a solid article such as wettability, adhesive property, surface energy and the like, for improving dispersibility, chemical resistance and the like, for preventing adhesion of a contaminant, for preventing electrostatic charge, for imparting functions such as electrical conductivity, photoelectricconductivity, thermal conductivity and the like, and the like.

The composite material is applicable to a wide range of field including paint, cosmetics, a protecting film foran electrical component and a mechanical part, a photoconductive material, a catalyst, a semiconductor such as a photocatalyst, a photoelectric conversion material and the like, a filler dispersion type composite building material, an additive for a toner, and the like. Further, according to the present invention, a method for producing the above-described composite material efficiently is provided.

What is claimed is:

1. A composite material comprising:
   a substrate;
   a compound A having a first functional group that bonds to the substrate and a second functional group that does not bond to the substrate; and
   a compound B that covalently bonds to the second functional group;
   wherein the first functional group of compound A is a hydrolyzable functional group, a halogen atom or a hydrogen atom, and compound B is a compound selected from the group consisting of a saturated or unsaturated aliphatic hydrocarbon group, an aromatic hydrocarbon group and an aromatic heterocycle-containing group, and has a functional group capable of covalently bonding to the second functional group of compound A, the functional group of compound B being selected from the group consisting of an amino group, a carboxyl group and a hydroxyl group.

2. A composite material according to claim 1, wherein the second functional group of a compound A is a halogen atom or an epoxy group.

3. A composite material according to claim 1, wherein compound A has a structure represented by one of the following formulae:

$$R^1 M^1 Y^1_3 \quad (1)$$

$$R^1 R^2 M^1 Y^1_2 \quad (2)$$

$$R^1 R^2 R^3 M^1 Y^1 \quad (3)$$

$$R^1\text{—SH} \quad (4)$$

wherein $R^1$ represents a saturated or unsaturated aliphatic hydrocarbon group having 1–20 carbon atoms, an aromatic hydrocarbon group, or a heterocycle-containing group, including said second functional group; $R^2$ and $R^3$ each represents the same group as $R^1$ or a saturated or unsaturated aliphatic hydrocarbon group having 1–20 carbon atoms, an aromatic hydrocarbon group, or a heterocycle-containing group; $M^1$ represents a tetravalent element other than carbon; and $Y^1$ represents a hydrolytic group, a halogen atom or an alkoxy group.

4. A composite material according to claim 3, wherein compound B is a compound selected from the group consisting of an aliphatic hydrocarbon group, an aromatic hydrocarbon group, or an aromatic heterocycle-containing group, having either an amino group or a carboxyl group.

5. A composite material according to claim 3, wherein said substrate is plate-shaped or granular shaped.

6. A composite material according to claim 3, wherein at least the surface of said substrate contains a compound selected from the group consisting of titanium oxide, strontium titanate, silicon oxide and germanium oxide.

7. A composite material according to claim 1, wherein compound B is a compound selected from the group consisting of an aliphatic hydrocarbon group, an aromatic hydrocarbon group, or an aromatic heterocycle-containing group, having either an amino group or a carboxyl group.

8. A composite material according to claim 1, wherein said substrate is plate-shaped or granular shaped.

9. A composite material according to claim 1, wherein at least the surface of said substrate contains a compound selected from the group consisting of titanium oxide, strontium titanate, silicon oxide and germanium oxide.

10. The composite material of claim 1, characterized as having photoconductive properties.

11. The composite material of claim 1, characterized as having semiconducting properties.

12. The composite material of claim 1, characterized as having photo-semiconducting properties.

13. The composite material of claim 12, characterized as having photo-catalytic properties.

14. The composite material of claim 1, characterized as having photoelectric conversion properties.

15. A method for producing a composite material, comprising:

bonding to a substrate a compound A including a group selected from the group consisting of an aliphatic hydrocarbon group, an aromatic hydrocarbon group, and a heterocycle-containing group, including a functional group capable of bonding to a compound B that is compound selected from the group consisting of a saturated or unsaturated aliphatic hydrocarbon group, an aromatic hydrocarbon group and an aromatic heterocycle-containing group; and covalently bonding a compound that is bonded to compound A to compound B having a functional group capable of covalently bonding to compound A, the functional group of compound B being selected from the group consisting of an amino group, a carboxyl group and a hydroxyl group.

16. A method for producing a composite material, comprising:

a) bonding a compound A which has a group selected from the group consisting of an aliphatic hydrocarbon group, an aromatic hydrocarbon group, and a heterocycle-containing group, which includes a functional group, to a substrate; and b) subsequently to step (a), covalently bonding compound A to a compound B that is compound selected from the group consisting of a saturated or unsaturated aliphatic hydrocarbon group, an aromatic hydrocarbon group and an aromatic heterocycle-containing group, and compound B having a functional group capable of covalently bonding to the functional group of compound A, the functional group of compound B being selected from the group consisting of an amino group, a carboxyl group and a hydroxyl group.

17. A method for producing the composite material according to claim 16, wherein compound A has a structure represented by one of the following formulae:

$$R^1 M^1 Y^1_3 \qquad (1)$$

$$R^1 R^2 M^1 Y^1_2 \qquad (2)$$

$$R^1 R^2 R^3 M^1 Y^1 \qquad (3)$$

$$R^1\text{—SH} \qquad (4)$$

wherein $R^1$ represents a saturated or unsaturated aliphatic hydrocarbon group, an aromatic hydrocarbon group, or a heterocycle-containing group, having 1–20 carbon atoms including said functional group; $R^2$ and $R^3$ represent the same group as $R^1$ or a saturated or unsaturated aliphatic hydrocarbon group, an aromatic hydrocarbon group, or a hetero-cyclecontaining group having 1–20 carbon atoms; $M^1$ represents a tetravalent element other than carbon; and $Y^1$ represents a hydrolyzable group, a halogen atom or an alkoxy group.

18. A method for producing a composite material according to claim 17, wherein after the $Y^1$ group or the SH group of compound A has been allowed to bond to the substrate, a functional group, contained in $R^1$, $R^2$ or $R^3$ of compound A, is allowed to bond to compound B, so that the composite material bonded to compound A being bonded to compound B and joined at the surface of the substrate, can be formed.

19. A method for producing a composite material according to claim 16, wherein said functional group is either a halogen atom or an epoxy group.

20. A method for producing a composite material according to claim 16, wherein the compound B is a compound selected from the group consisting of an aliphatic hydrocarbon group, an aromatic hydrocarbon group and an aromatic heterocycle-containing group, having either an amino group or a carboxyl group.

21. A method for producing a composite material according to claim 16, wherein compound B is a compound selected from the group consisting of a saturated or unsaturated aliphatic hydrocarbon group, aromatic hydrocarbon group or an aromatic heterocycle-containing group, including ruthenium.

22. A method for producing a composite material according to claim 16, wherein compound A and compound B are allowed to bond to each other in a state where at least one of the compound A and the compound B is liquefied or vaporized.

23. A method for producing a composite material according to claim 16, wherein the substrate is dipped in a solution containing compound A and compound B.

* * * * *